(12) United States Patent
Dong et al.

(10) Patent No.: US 12,461,345 B2
(45) Date of Patent: Nov. 4, 2025

(54) OPTICAL LENS ASSEMBLY

(71) Applicant: GENIUS ELECTRONIC OPTICAL (XIAMEN) CO., LTD., Fujian (CN)

(72) Inventors: Chuanbo Dong, Fujian (CN); Qingzhi Zhu, Fujian (CN); Ou Zhou, Fujian (CN); Hung-Chien Hsieh, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 18/479,838

(22) Filed: Oct. 3, 2023

(65) Prior Publication Data

US 2024/0094510 A1  Mar. 21, 2024

Related U.S. Application Data

(63) Continuation of application No. 17/115,796, filed on Dec. 9, 2020, now abandoned.

(30) Foreign Application Priority Data

Sep. 24, 2020  (CN) .......................... 202011015295.1

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC ........ G02B 9/62; G02B 9/64; G02B 13/0045; G02B 13/0015; G02B 13/16; G02B 13/18; G02B 27/0025; G02B 27/0012; G02B 27/0172; G02B 15/146; H04N 5/222; H04N 5/2254
USPC ......... 359/656–658, 708, 713, 749, 756–762
See application file for complete search history.

(56) References Cited

U.S. PATENT DOCUMENTS

| | | | |
|---|---|---|---|
| 2009/0219630 A1* | 9/2009 | Yamamoto | G02B 7/008 359/708 |
| 2015/0241671 A1* | 8/2015 | Chang | G02B 13/007 359/714 |
| 2018/0045918 A1* | 2/2018 | Seo | G02B 13/0045 |
| 2020/0103619 A1* | 4/2020 | Heu | G02B 27/0025 |

FOREIGN PATENT DOCUMENTS

CN  109100854 A  * 12/2018  ......... G02B 13/0045

OTHER PUBLICATIONS

CN109100854 Translation (Year: 2018).*

* cited by examiner

*Primary Examiner* — Travis S Fissel
(74) *Attorney, Agent, or Firm* — JCIPRNET

(57) ABSTRACT

An optical lens assembly, sequentially including a first lens element to a sixth lens element from a first side to a second side along an optical axis, is provided. The optical lens assembly satisfies the conditional expressions of $V1+V2+V6 \leq 120.000$ and $EFL*Fno/D11t22 \leq 11.500$. Furthermore, other optical lens element assemblies are also provided.

19 Claims, 32 Drawing Sheets

| First embodiment |||||||
|---|---|---|---|---|---|---|
| Effective focal length (EFL) = 2.248 mm, Half field of view (HFOV) = 36.495°, System length (TTL) = 4.611 mm, F-number (Fno) = 1.518, Light circle radius (LCR) = 2.308 mm |||||||
| Element | Surface | Radius (mm) | Thickness (mm) | Refractive index | Abbe number | Focal length (mm) |
| Object | | Infinity | Infinity | | | |
| Aperture 0 | | Infinity | -0.158 | | | |
| First lens element 1 | First side surface 15 | 1.623 | 0.190 | 1.661 | 20.373 | -13.620 |
| | Second side surface 16 | 1.314 | 0.090 | | | |
| Second lens element 2 | First side surface 25 | 1.715 | 0.578 | 1.535 | 55.712 | 4.667 |
| | Second side surface 26 | 4.767 | 0.446 | | | |
| Third lens element 3 | First side surface 35 | 2.201 | 0.375 | 1.566 | 37.426 | 6.813 |
| | Second side surface 36 | 4.754 | 0.320 | | | |
| Fourth lens element 4 | First side surface 45 | 6.020 | 0.311 | 1.661 | 20.373 | 54.515 |
| | Second side surface 46 | 7.054 | 0.287 | | | |
| Fifth lens element 5 | First side surface 55 | 3.586 | 0.458 | 1.661 | 20.373 | 5.077 |
| | Second side surface 56 | -67.692 | 0.502 | | | |
| Sixth lens element 6 | First side surface 65 | -1.203 | 0.391 | 1.642 | 22.409 | 1.823 |
| | Second side surface 66 | -0.675 | 0.664 | | | |
| Multi-light source generating unit 15 | Reference surface 100a | Infinity | | | | |

FIG. 9

| Surface | K | $a_2$ | $a_4$ | $a_6$ | $a_8$ |
|---|---|---|---|---|---|
| 15 | -1.750860E+00 | 0.000000E+00 | -4.868630E-02 | -6.534805E-03 | -4.636560E-02 |
| 16 | -3.150792E-01 | 0.000000E+00 | -1.718413E-01 | 1.288545E-01 | -1.766743E-01 |
| 25 | -1.093103E+00 | 0.000000E+00 | -1.148474E-01 | 1.737577E-01 | -1.268426E-01 |
| 26 | -5.385067E+00 | 0.000000E+00 | -1.447618E-01 | 7.392925E-02 | -8.606864E-02 |
| 35 | -3.400228E-01 | 0.000000E+00 | -8.827472E-02 | -3.188394E-02 | -1.182497E-02 |
| 36 | 1.487743E+01 | 0.000000E+00 | -8.634813E-02 | -1.616166E-02 | -1.373669E-01 |
| 45 | 2.089074E+01 | 0.000000E+00 | -1.737533E-01 | 2.269615E-01 | -3.801431E-01 |
| 46 | -3.956649E+02 | 0.000000E+00 | -1.662738E-01 | 1.420050E-01 | -9.885476E-02 |
| 55 | -4.267541E+01 | 0.000000E+00 | -1.196123E-01 | -5.379657E-02 | 4.106101E-02 |
| 56 | 0.000000E+00 | 0.000000E+00 | -6.931651E-02 | -6.802534E-02 | 6.357669E-02 |
| 65 | -9.387251E-01 | 0.000000E+00 | -7.953925E-02 | 8.680990E-02 | -1.506682E-02 |
| 66 | -3.956820E+02 | 0.000000E+00 | -1.802632E-01 | 1.260540E-01 | -4.724656E-02 |
| Surface | $a_{10}$ | $a_{12}$ | $a_{14}$ | $a_{16}$ | $a_{18}$ |
| 15 | 9.580385E-03 | 4.041990E-03 | 5.514918E-03 | 2.216765E-03 | |
| 16 | 9.384199E-02 | -2.461532E-03 | -1.242787E-02 | 1.957978E-03 | |
| 25 | 8.214277E-02 | -2.859061E-02 | -3.089753E-03 | -3.096805E-03 | |
| 26 | 9.962694E-02 | -3.639627E-02 | -6.666287E-03 | -1.898098E-04 | |
| 35 | 1.065565E-03 | 2.921795E-02 | 1.582701E-02 | -2.388372E-02 | |
| 36 | 9.730356E-02 | 2.965185E-02 | -1.785402E-02 | -1.160049E-02 | |
| 45 | 3.282945E-01 | -2.567637E-01 | 1.838669E-01 | -6.114682E-02 | |
| 46 | 1.640564E-02 | 1.044406E-02 | 3.226882E-03 | -2.285909E-03 | |
| 55 | -9.594900E-03 | -8.014466E-03 | 1.068723E-03 | 1.185743E-03 | |
| 56 | -2.297288E-02 | 4.365497E-03 | -6.709005E-04 | 5.644885E-05 | |
| 65 | -9.609442E-04 | 6.379116E-04 | -6.328675E-05 | 9.803441E-07 | |
| 66 | 7.852414E-03 | -6.954193E-05 | -1.575619E-04 | 1.824991E-05 | |

FIG. 10

| Second embodiment ||||||
|---|---|---|---|---|---|
| Effective focal length (EFL) = 4.193 mm, Half field of view (HFOV) = 36.500°, System length (TTL) = 5.123 mm, F-number (Fno) = 2.459, Light circle radius (LCR) = 2.507 mm ||||||
| Element | Surface | Radius (mm) | Thickness (mm) | Refractive index | Abbe number | Focal length (mm) |
| Object | | Infinity | Infinity | | | |
| Aperture 0 | | Infinity | -0.097 | | | |
| First lens element 1 | First side surface 15 | 1.840 | 0.383 | 1.661 | 20.373 | -15.244 |
| | Second side surface 16 | 1.430 | 0.042 | | | |
| Second lens element 2 | First side surface 25 | 1.787 | 0.907 | 1.553 | 71.685 | 4.167 |
| | Second side surface 26 | 6.390 | 0.269 | | | |
| Third lens element 3 | First side surface 35 | 2.247 | 0.570 | 1.566 | 37.426 | 6.542 |
| | Second side surface 36 | 5.115 | 0.200 | | | |
| Fourth lens element 4 | First side surface 45 | 10.935 | 0.292 | 1.661 | 20.373 | 164.931 |
| | Second side surface 46 | 12.000 | 0.350 | | | |
| Fifth lens element 5 | First side surface 55 | 16.774 | 0.573 | 1.661 | 20.373 | 20.569 |
| | Second side surface 56 | -77.806 | 0.614 | | | |
| Sixth lens element 6 | First side surface 65 | -1.428 | 0.903 | 1.642 | 22.409 | -44.173 |
| | Second side surface 66 | -1.878 | 0.020 | | | |
| Multi-light source generating unit 15 | Reference surface 100a | Infinity | | | | |

FIG. 13

| Surface | K | $a_2$ | $a_4$ | $a_6$ | $a_8$ |
|---|---|---|---|---|---|
| 15 | -1.240422E+00 | 0.000000E+00 | -4.111232E-02 | 5.590536E-03 | -3.622118E-02 |
| 16 | -2.686538E-01 | 0.000000E+00 | -1.718477E-01 | 1.378471E-01 | -1.714828E-01 |
| 25 | -8.310927E-01 | 0.000000E+00 | -1.077747E-01 | 1.656096E-01 | -1.331173E-01 |
| 26 | -5.174953E+00 | 0.000000E+00 | -1.389162E-01 | 8.164266E-02 | -8.786513E-02 |
| 35 | -8.769572E-01 | 0.000000E+00 | -1.019192E-01 | -1.610554E-02 | -4.985956E-03 |
| 36 | 1.676321E+01 | 0.000000E+00 | -5.723166E-02 | -2.497309E-03 | -1.469380E-01 |
| 45 | -5.109694E+00 | 0.000000E+00 | -1.731185E-01 | 2.877264E-01 | -4.645806E-01 |
| 46 | -3.956649E+02 | 0.000000E+00 | -2.236378E-01 | 4.394077E-01 | -6.163061E-01 |
| 55 | 6.839688E+01 | 0.000000E+00 | -3.189634E-01 | 2.758779E-01 | -2.569604E-01 |
| 56 | 0.000000E+00 | 0.000000E+00 | -2.459904E-01 | 1.893827E-01 | -1.735310E-01 |
| 65 | -7.879656E-01 | 0.000000E+00 | -6.644475E-02 | 1.416073E-01 | -1.145352E-01 |
| 66 | -3.956820E+02 | 0.000000E+00 | -1.671804E-01 | 1.583577E-01 | -7.759323E-02 |
| Surface | $a_{10}$ | $a_{12}$ | $a_{14}$ | $a_{16}$ | $a_{18}$ |
| 15 | 1.390450E-02 | 2.909191E-03 | 5.380125E-04 | -3.279069E-03 | |
| 16 | 9.386498E-02 | -5.426615E-03 | -1.459107E-02 | 2.741935E-03 | |
| 25 | 8.008188E-02 | -2.649156E-02 | 4.989471E-04 | 1.302524E-03 | |
| 26 | 9.163529E-02 | -4.153962E-02 | -6.756075E-03 | 7.371205E-03 | |
| 35 | -1.148646E-02 | 1.750866E-02 | 1.067740E-02 | -1.888791E-02 | |
| 36 | 9.159059E-02 | 3.005192E-02 | -1.615969E-02 | -1.094820E-02 | |
| 45 | 2.314544E-01 | 4.102016E-02 | -3.949913E-02 | -7.584218E-03 | |
| 46 | 4.787749E-01 | -1.791473E-01 | 1.385474E-02 | 5.203483E-03 | |
| 55 | 1.454303E-01 | -4.703069E-02 | 4.453692E-03 | 8.956036E-04 | |
| 56 | 1.194933E-01 | -5.502230E-02 | 1.498893E-02 | -1.767334E-03 | |
| 65 | 6.282313E-02 | -2.023427E-02 | 3.422677E-03 | -2.368697E-04 | |
| 66 | 2.226083E-02 | -3.790418E-03 | 3.529248E-04 | -1.383490E-05 | |

FIG. 14

| Third embodiment |||||||
|---|---|---|---|---|---|---|
| Effective focal length (EFL) = 3.354 mm, Half field of view (HFOV) = 36.500°, System length (TTL) = 4.263 mm, F-number (Fno) = 1.677, Light circle radius (LCR) = 2.113 mm |||||||
| Element | Surface | Radius (mm) | Thickness (mm) | Refractive index | Abbe number | Focal length (mm) |
| Object | | Infinity | Infinity | | | |
| Aperture 0 | | Infinity | -0.222 | | | |
| First lens element 1 | First side surface 15 | 1.668 | 0.338 | 1.661 | 20.373 | -20.868 |
| | Second side surface 16 | 1.369 | 0.070 | | | |
| Second lens element 2 | First side surface 25 | 1.677 | 0.733 | 1.535 | 55.712 | 4.173 |
| | Second side surface 26 | 5.605 | 0.288 | | | |
| Third lens element 3 | First side surface 35 | 2.186 | 0.393 | 1.566 | 37.426 | 6.684 |
| | Second side surface 36 | 4.780 | 0.185 | | | |
| Fourth lens element 4 | First side surface 45 | 6.070 | 0.316 | 1.661 | 20.373 | 51.099 |
| | Second side surface 46 | 7.219 | 0.172 | | | |
| Fifth lens element 5 | First side surface 55 | 4.889 | 0.566 | 1.661 | 20.373 | 6.210 |
| | Second side surface 56 | -27.299 | 0.504 | | | |
| Sixth lens element 6 | First side surface 65 | -1.218 | 0.335 | 1.642 | 22.409 | -2.171 |
| | Second side surface 66 | -9.650 | 0.363 | | | |
| Multi-light source generating unit 15 | Reference surface 100a | Infinity | | | | |

FIG. 17

| Surface | K | $a_2$ | $a_4$ | $a_6$ | $a_8$ |
|---|---|---|---|---|---|
| 15 | -1.203838E+00 | 0.000000E+00 | -3.835787E-02 | -1.426359E-03 | -4.098165E-02 |
| 16 | -3.155197E-01 | 0.000000E+00 | -1.724152E-01 | 1.293077E-01 | -1.788139E-01 |
| 25 | -1.113857E+00 | 0.000000E+00 | -1.160586E-01 | 1.714449E-01 | -1.270075E-01 |
| 26 | -1.270922E+01 | 0.000000E+00 | -1.422216E-01 | 9.093226E-02 | -8.327278E-02 |
| 35 | -6.667343E-01 | 0.000000E+00 | -9.788621E-02 | -3.107231E-02 | -3.202427E-03 |
| 36 | 1.594095E+01 | 0.000000E+00 | -6.575538E-02 | -2.345664E-02 | -1.395729E-01 |
| 45 | 2.255284E+01 | 0.000000E+00 | -1.567213E-01 | 2.282928E-01 | -3.895698E-01 |
| 46 | -3.956649E+02 | 0.000000E+00 | -1.623877E-01 | 1.423213E-01 | -9.593684E-02 |
| 55 | -9.000119E+01 | 0.000000E+00 | -1.330846E-01 | -3.620112E-02 | 3.780985E-02 |
| 56 | 0.000000E+00 | 0.000000E+00 | -4.549917E-02 | -7.263479E-02 | 6.406290E-02 |
| 65 | -9.083902E-01 | 0.000000E+00 | -8.176971E-02 | 8.753702E-02 | -1.503579E-02 |
| 66 | -3.956820E+02 | 0.000000E+00 | -1.785273E-01 | 1.266181E-01 | -4.644566E-02 |
| Surface | $a_{10}$ | $a_{12}$ | $a_{14}$ | $a_{16}$ | $a_{18}$ |
| 15 | 1.079477E-02 | 8.602615E-04 | 1.855759E-04 | 4.654694E-04 | |
| 16 | 9.064388E-02 | -5.212395E-03 | -1.295963E-02 | 3.768893E-03 | |
| 25 | 8.259025E-02 | -2.759390E-02 | -5.370378E-04 | 1.432004E-03 | |
| 26 | 9.893465E-02 | -3.430270E-02 | -4.234775E-03 | 3.460711E-04 | |
| 35 | 4.647164E-03 | 2.490213E-02 | 1.518824E-02 | -2.423924E-02 | |
| 36 | 1.013371E-01 | 3.392081E-02 | -1.750851E-02 | -1.457909E-02 | |
| 45 | 3.281001E-01 | -2.503858E-01 | 1.856225E-01 | -6.792566E-02 | |
| 46 | 1.535565E-02 | 8.644175E-03 | 2.578808E-03 | -2.347788E-03 | |
| 55 | -9.726263E-03 | -6.968954E-03 | 1.389694E-03 | 1.474032E-03 | |
| 56 | -2.291060E-02 | 4.316638E-03 | -6.852599E-04 | 8.923470E-05 | |
| 65 | -1.187687E-03 | 5.938043E-04 | -5.734764E-05 | 1.365750E-06 | |
| 66 | 7.796317E-03 | -1.162997E-04 | -1.594609E-04 | 1.775084E-05 | |

FIG. 18

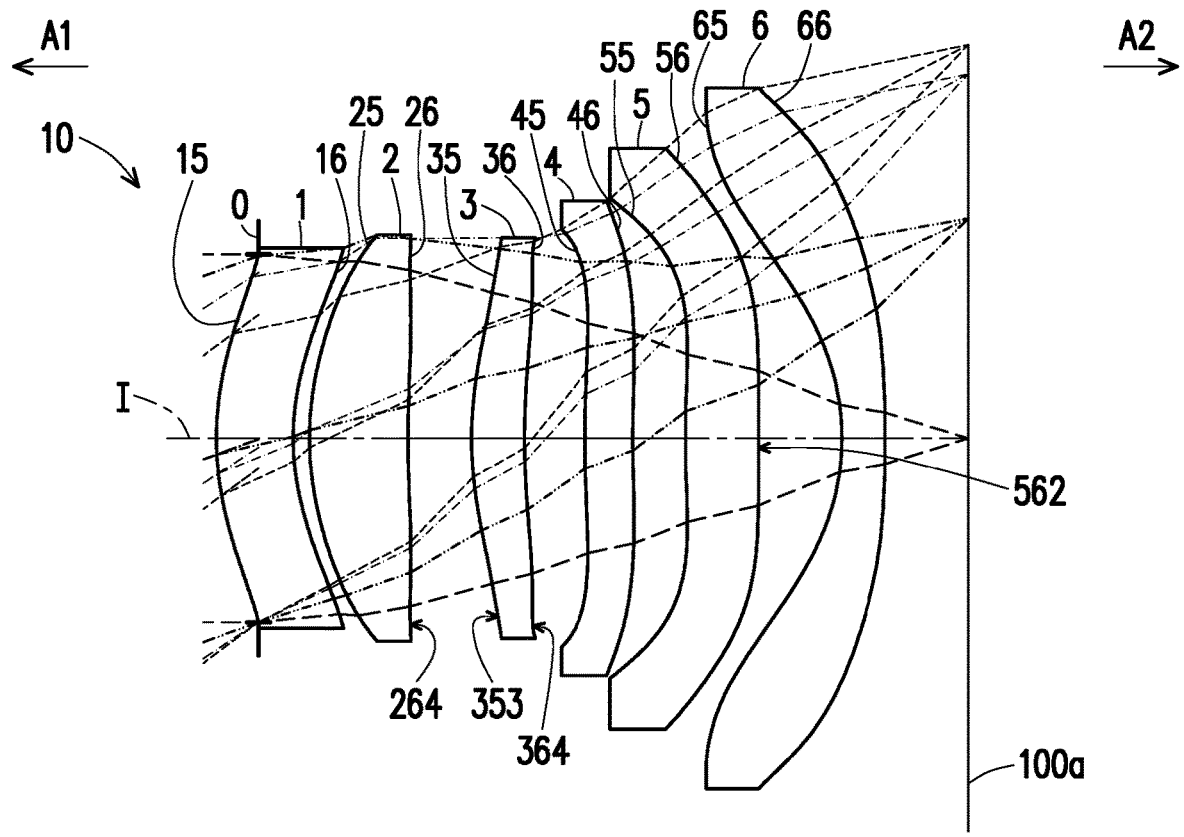
FIG. 19
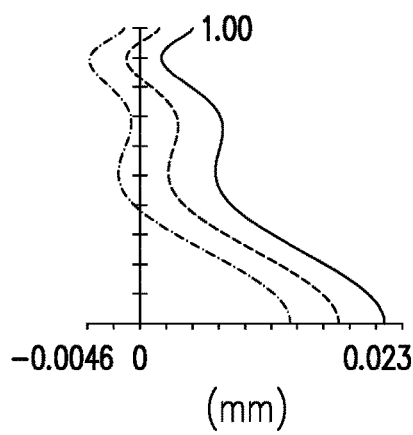
Longitudinal spherical aberration
Field of view
FIG. 20A
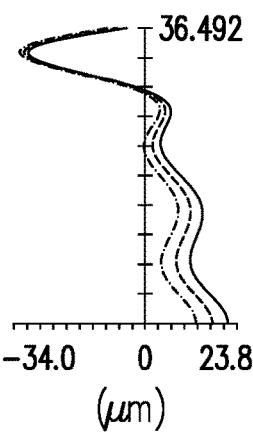
Field curvature (sagittal direction)
Half field of view (°)
FIG. 20B
Field curvature (tangential direction)
Half field of view (°)
FIG. 20C
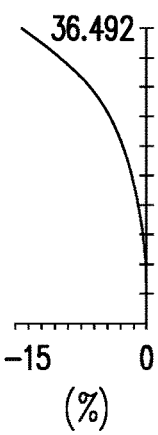
Distortion
Half field of view (°)
FIG. 20D

| Fourth embodiment |||||||
|---|---|---|---|---|---|---|
| Effective focal length (EFL) = 3.405 mm, Half field of view (HFOV) = 36.492°, |||||||
| System length (TTL) = 4.088 mm, F-number (Fno) = 1.703, Light circle radius (LCR) = 2.140 mm |||||||
| Element | Surface | Radius (mm) | Thickness (mm) | Refractive index | Abbe number | Focal length (mm) |
| Object | | Infinity | Infinity | | | |
| Aperture 0 | | Infinity | -0.229 | | | |
| First lens element 1 | First side surface 15 | 1.690 | 0.420 | 1.661 | 20.373 | -23.429 |
| | Second side surface 16 | 1.374 | 0.089 | | | |
| Second lens element 2 | First side surface 25 | 1.627 | 0.534 | 1.535 | 55.712 | 4.021 |
| | Second side surface 26 | 5.793 | 0.345 | | | |
| Third lens element 3 | First side surface 35 | 2.104 | 0.288 | 1.566 | 37.426 | 6.465 |
| | Second side surface 36 | 4.646 | 0.330 | | | |
| Fourth lens element 4 | First side surface 45 | 5.900 | 0.260 | 1.661 | 20.373 | 51.090 |
| | Second side surface 46 | 6.998 | 0.285 | | | |
| Fifth lens element 5 | First side surface 55 | 5.128 | 0.397 | 1.661 | 20.373 | 8.207 |
| | Second side surface 56 | 70.075 | 0.453 | | | |
| Sixth lens element 6 | First side surface 65 | -1.341 | 0.236 | 1.642 | 22.409 | -2.430 |
| | Second side surface 66 | -9.318 | 0.452 | | | |
| Multi-light source generating unit 15 | Reference surface 100a | Infinity | | | | |

FIG. 21

| Surface | K | $a_2$ | $a_4$ | $a_6$ | $a_8$ |
|---|---|---|---|---|---|
| 15 | -1.166825E+00 | 0.000000E+00 | -3.656395E-02 | 2.054154E-03 | -3.962989E-02 |
| 16 | -2.838019E-01 | 0.000000E+00 | -1.684994E-01 | 1.301740E-01 | -1.796531E-01 |
| 25 | -1.256543E+00 | 0.000000E+00 | -1.186594E-01 | 1.720876E-01 | -1.254968E-01 |
| 26 | -1.416701E+01 | 0.000000E+00 | -1.411812E-01 | 9.231280E-02 | -8.211236E-02 |
| 35 | -2.375898E-01 | 0.000000E+00 | -8.779040E-02 | -3.467063E-02 | -6.565618E-03 |
| 36 | 1.640920E+01 | 0.000000E+00 | -6.290922E-02 | -1.486540E-02 | -1.336795E-01 |
| 45 | 2.482090E+01 | 0.000000E+00 | -1.818091E-01 | 2.320456E-01 | -3.822402E-01 |
| 46 | -3.956649E+02 | 0.000000E+00 | -1.390161E-01 | 1.312558E-01 | -9.910745E-02 |
| 55 | -7.592203E+01 | 0.000000E+00 | -1.572186E-01 | -4.273856E-02 | 3.901390E-02 |
| 56 | 0.000000E+00 | 0.000000E+00 | -8.569195E-02 | -7.383043E-02 | 6.650480E-02 |
| 65 | -8.996451E-01 | 0.000000E+00 | -8.173761E-02 | 8.729541E-02 | -1.536199E-02 |
| 66 | -3.956820E+02 | 0.000000E+00 | -1.726137E-01 | 1.237786E-01 | -4.749188E-02 |
| Surface | $a_{10}$ | $a_{12}$ | $a_{14}$ | $a_{16}$ | $a_{18}$ |
| 15 | 1.069883E-02 | 2.825293E-04 | -9.990175E-05 | 5.448185E-04 | |
| 16 | 9.002585E-02 | -5.799219E-03 | -1.349741E-02 | 4.295259E-03 | |
| 25 | 8.415528E-02 | -2.658272E-02 | -3.440105E-04 | 1.325149E-03 | |
| 26 | 1.006722E-01 | -3.406031E-02 | -4.285507E-03 | 1.059181E-03 | |
| 35 | 5.333391E-03 | 3.059429E-02 | 1.572482E-02 | -2.328625E-02 | |
| 36 | 1.012682E-01 | 3.229695E-02 | -1.626638E-02 | -1.232211E-02 | |
| 45 | 3.224747E-01 | -2.601897E-01 | 1.817551E-01 | -6.273446E-02 | |
| 46 | 1.605804E-02 | 9.311773E-03 | 2.570422E-03 | -2.495294E-03 | |
| 55 | -1.003977E-02 | -7.322749E-03 | 1.504969E-03 | 1.334785E-03 | |
| 56 | -2.247450E-02 | 4.440846E-03 | -6.588687E-04 | 5.312715E-05 | |
| 65 | -1.062092E-03 | 6.076953E-04 | -6.719113E-05 | 3.415578E-06 | |
| 66 | 7.776096E-03 | -8.221360E-05 | -1.569419E-04 | 1.917855E-05 | |

FIG. 22

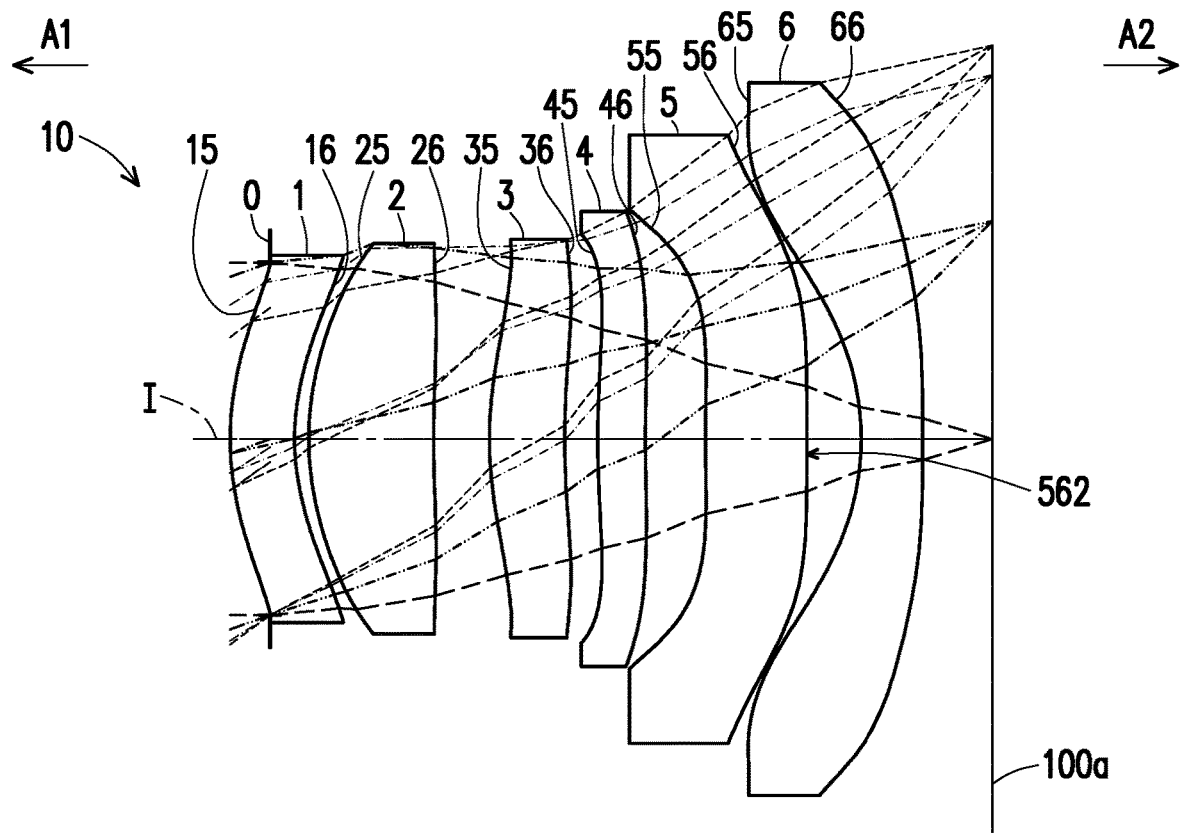
FIG. 23
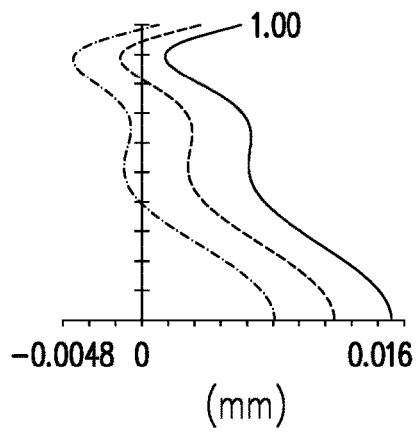
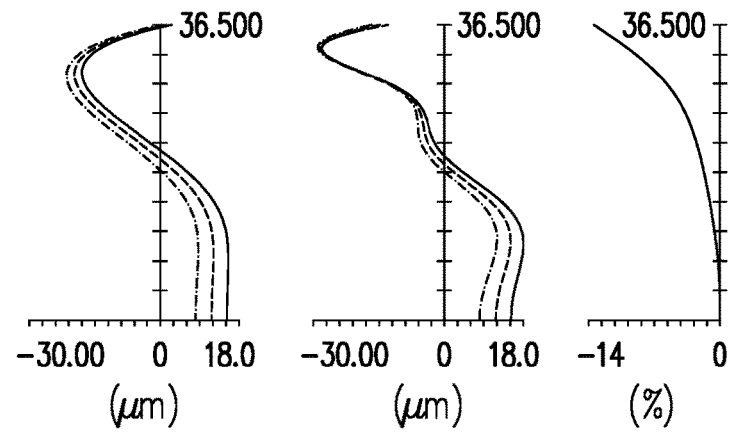
FIG. 24A   FIG. 24B   FIG. 24C   FIG. 24D

| Fifth embodiment |||||||
|---|---|---|---|---|---|---|
| Effective focal length (EFL) = 3.507 mm, Half field of view (HFOV) =36.500°, System length (TTL) = 4.323 mm, F-number (Fno) =1.754, Light circle radius (LCR) = 2.233 mm |||||||
| Element | Surface | Radius (mm) | Thickness (mm) | Refractive index | Abbe number | Focal length (mm) |
| Object | | Infinity | Infinity | | | |
| Aperture 0 | | Infinity | -0.225 | | | |
| First lens element 1 | First side surface 15 | 1.695 | 0.368 | 1.661 | 20.373 | -20.045 |
| | Second side surface 16 | 1.375 | 0.081 | | | |
| Second lens element 2 | First side surface 25 | 1.618 | 0.706 | 1.535 | 55.712 | 3.874 |
| | Second side surface 26 | 6.112 | 0.316 | | | |
| Third lens element 3 | First side surface 35 | 2.239 | 0.426 | 1.566 | 37.426 | 6.982 |
| | Second side surface 36 | 4.752 | 0.191 | | | |
| Fourth lens element 4 | First side surface 45 | 5.290 | 0.270 | 1.661 | 20.373 | 16.931 |
| | Second side surface 46 | 9.679 | 0.340 | | | |
| Fifth lens element 5 | First side surface 55 | 11.189 | 0.571 | 1.661 | 20.373 | 18.281 |
| | Second side surface 56 | 121.873 | 0.308 | | | |
| Sixth lens element 6 | First side surface 65 | -1.575 | 0.352 | 1.642 | 22.409 | -2.442 |
| | Second side surface 66 | -158.654 | 0.395 | | | |
| Multi-light source generating unit 15 | Reference surface 100a | Infinity | | | | |

FIG. 25

| Surface | K | $a_2$ | $a_4$ | $a_6$ | $a_8$ |
|---|---|---|---|---|---|
| 15 | -1.107071E+00 | 0.000000E+00 | -3.908384E-02 | 3.148391E-03 | -3.894040E-02 |
| 16 | -2.786662E-01 | 0.000000E+00 | -1.725603E-01 | 1.334058E-01 | -1.778475E-01 |
| 25 | -1.046636E+00 | 0.000000E+00 | -1.156474E-01 | 1.684436E-01 | -1.286279E-01 |
| 26 | -7.091784E-01 | 0.000000E+00 | -1.414323E-01 | 8.748384E-02 | -8.144391E-02 |
| 35 | -3.782853E-01 | 0.000000E+00 | -9.250341E-02 | -3.095325E-02 | 6.752525E-04 |
| 36 | 1.592430E+01 | 0.000000E+00 | -7.131766E-02 | -5.625668E-03 | -1.425173E-01 |
| 45 | 1.906981E+01 | 0.000000E+00 | -1.605896E-01 | 2.191638E-01 | -3.754048E-01 |
| 46 | -3.956649E+02 | 0.000000E+00 | -1.205758E-01 | 1.368013E-01 | -9.804996E-02 |
| 55 | -9.000421E+01 | 0.000000E+00 | -1.715125E-01 | -1.574321E-02 | 2.346478E-02 |
| 56 | 0.000000E+00 | 0.000000E+00 | -7.548093E-02 | -7.075436E-02 | 6.593572E-02 |
| 65 | -7.746882E-01 | 0.000000E+00 | -9.462429E-02 | 8.962766E-02 | -1.511441E-02 |
| 66 | -3.956820E+02 | 0.000000E+00 | -1.594982E-01 | 1.210500E-01 | -4.622133E-02 |
| Surface | $a_{10}$ | $a_{12}$ | $a_{14}$ | $a_{16}$ | $a_{18}$ |
| 15 | 1.159259E-02 | 1.713614E-04 | -1.419465E-04 | 1.872516E-04 | |
| 16 | 8.939246E-02 | -6.396480E-03 | -1.357581E-02 | 4.372483E-03 | |
| 25 | 8.231055E-02 | -2.737491E-02 | 7.960139E-04 | 9.273769E-04 | |
| 26 | 9.711474E-02 | -3.600604E-02 | -3.071547E-03 | 9.745606E-04 | |
| 35 | 2.767400E-03 | 2.356560E-02 | 1.070883E-02 | -2.079825E-02 | |
| 36 | 9.939445E-02 | 3.264382E-02 | -1.468816E-02 | -1.432681E-02 | |
| 45 | 3.209844E-01 | -2.579548E-01 | 1.865904E-01 | -6.465708E-02 | |
| 46 | 1.300358E-02 | 7.295578E-03 | 2.537814E-03 | -1.879255E-03 | |
| 55 | -7.082028E-03 | -7.899364E-03 | 1.042033E-03 | 1.915829E-03 | |
| 56 | -2.214513E-02 | 4.494016E-03 | -6.570287E-04 | 5.047404E-05 | |
| 65 | -1.086591E-03 | 6.060016E-04 | -7.650438E-05 | 5.180703E-06 | |
| 66 | 7.796408E-03 | -1.049816E-04 | -1.661972E-04 | 1.913147E-05 | |

FIG. 26

Longitudinal spherical aberration Field of view

Field curvature (sagittal direction) Half field of view (°)

Field curvature (tangential direction) Half field of view (°)

Distortion Half field of view (°)

| Sixth embodiment |||||||
|---|---|---|---|---|---|---|
| Effective focal length (EFL) = 2.905 mm, Half field of view (HFOV) =36.500°, |||||||
| System length (TTL) = 3.430 mm, F-number (Fno) = 1.453, Light circle radius (LCR) = 1.843 mm |||||||
| Element | Surface | Radius (mm) | Thickness (mm) | Refractive index | Abbe number | Focal length (mm) |
| Object | | Infinity | Infinity | | | |
| Aperture 0 | | Infinity | -0.242 | | | |
| First lens element 1 | First side surface 15 | 1.557 | 0.326 | 1.661 | 20.373 | -5412.056 |
| | Second side surface 16 | 1.425 | 0.045 | | | |
| Second lens element 2 | First side surface 25 | 1.255 | 0.518 | 1.535 | 55.712 | 3.007 |
| | Second side surface 26 | 4.775 | 0.232 | | | |
| Third lens element 3 | First side surface 35 | 3.200 | 0.295 | 1.566 | 37.426 | -57438224.316 |
| | Second side surface 36 | 3.093 | 0.199 | | | |
| Fourth lens element 4 | First side surface 45 | 5.567 | 0.426 | 1.661 | 20.373 | 80.651 |
| | Second side surface 46 | 6.013 | 0.286 | | | |
| Fifth lens element 5 | First side surface 55 | 2.472 | 0.378 | 1.661 | 20.373 | 6.585 |
| | Second side surface 56 | 5.250 | 0.343 | | | |
| Sixth lens element 6 | First side surface 65 | -1.635 | 0.099 | 1.642 | 22.409 | -2.682 |
| | Second side surface 66 | -25.698 | 0.283 | | | |
| Multi-light source generating unit 15 | Reference surface 100a | Infinity | | | | |

FIG. 29

| Surface | K | $a_2$ | $a_4$ | $a_6$ | $a_8$ |
|---|---|---|---|---|---|
| 15 | -9.456778E-01 | 0.000000E+00 | -3.272197E-02 | -4.608588E-03 | -5.868321E-02 |
| 16 | -3.949195E-01 | 0.000000E+00 | -1.821769E-01 | 1.215746E-01 | -2.521774E-02 |
| 25 | -8.839304E-01 | 0.000000E+00 | -1.050295E-01 | 1.754598E-01 | -1.189824E-01 |
| 26 | -2.520285E+00 | 0.000000E+00 | -1.955418E-01 | 5.846583E-01 | -1.696586E+00 |
| 35 | 2.677320E-01 | 0.000000E+00 | -8.065314E-02 | -5.330281E-02 | -7.367301E-02 |
| 36 | 1.311601E+01 | 0.000000E+00 | -1.661005E-01 | 1.041032E+00 | -8.118148E+00 |
| 45 | 1.214144E+00 | 0.000000E+00 | -2.003008E-01 | 6.128125E-02 | 2.770144E-01 |
| 46 | -3.956649E+02 | 0.000000E+00 | -9.992701E-02 | 1.179108E-02 | 1.589424E-01 |
| 55 | -2.244079E+01 | 0.000000E+00 | -1.559445E-01 | -5.609870E-02 | 4.197348E-02 |
| 56 | 0.000000E+00 | 0.000000E+00 | -1.158910E-01 | -9.691423E-02 | 6.385172E-02 |
| 65 | -9.253203E-01 | 0.000000E+00 | -7.921576E-02 | 8.664149E-02 | -1.561771E-02 |
| 66 | -3.956820E+02 | 0.000000E+00 | -1.490997E-01 | 1.215197E-01 | -4.821830E-02 |
| Surface | $a_{10}$ | $a_{12}$ | $a_{14}$ | $a_{16}$ | $a_{18}$ |
| 15 | 2.193889E-02 | -1.671442E-02 | 7.433643E-03 | 2.261087E-03 | |
| 16 | -5.378817E-01 | 1.032535E+00 | -8.114679E-01 | 2.406634E-01 | |
| 25 | 8.868268E-02 | -3.738322E-02 | 4.259042E-03 | 3.130050E-04 | |
| 26 | 2.771573E+00 | -2.464402E+00 | 1.152033E+00 | -2.246166E-01 | |
| 35 | 5.660782E-01 | -7.716037E-01 | 5.943855E-01 | -1.542602E-01 | |
| 36 | 3.376921E+01 | -7.571947E+01 | 8.608231E+01 | -3.900762E+01 | |
| 45 | 2.819742E-01 | -6.960472E+00 | 1.494044E+01 | -1.029447E+01 | |
| 46 | -3.167139E-01 | 2.679957E-01 | -1.114797E-01 | 1.810533E-02 | |
| 55 | -7.136460E-03 | -6.745887E-03 | 1.248363E-03 | 1.050867E-03 | |
| 56 | -2.200246E-02 | 4.089781E-03 | -1.186794E-03 | -2.926709E-04 | |
| 65 | -1.131513E-03 | 5.959386E-04 | -6.866507E-05 | 3.908898E-06 | |
| 66 | 7.658576E-03 | -9.273044E-05 | -1.556616E-04 | 2.015160E-05 | |

FIG. 30

| Seventh embodiment |||||||
|---|---|---|---|---|---|---|
| Effective focal length (EFL) = 2.854 mm, Half field of view (HFOV) = 36.479°, System length (TTL) = 4.197 mm, F-number (Fno) = 1.427, Light circle radius (LCR) = 2.140 mm |||||||
| Element | Surface | Radius (mm) | Thickness (mm) | Refractive index | Abbe number | Focal length (mm) |
| Object | | Infinity | Infinity | | | |
| Aperture 0 | | Infinity | 0.000 | | | |
| First lens element 1 | First side surface 15 | 1.667 | 0.241 | 1.661 | 20.373 | -12.869 |
| | Second side surface 16 | 1.316 | 0.031 | | | |
| Second lens element 2 | First side surface 25 | 1.509 | 0.650 | 1.541 | 47.230 | 3.970 |
| | Second side surface 26 | 4.232 | 0.197 | | | |
| Third lens element 3 | First side surface 35 | 3.312 | 0.535 | 1.566 | 37.426 | 5.910 |
| | Second side surface 36 | 164.931 | 0.241 | | | |
| Fourth lens element 4 | First side surface 45 | 3.485 | 0.258 | 1.661 | 20.373 | 11.832 |
| | Second side surface 46 | 6.015 | 0.285 | | | |
| Fifth lens element 5 | First side surface 55 | 352.692 | 0.718 | 1.661 | 20.373 | -250.286 |
| | Second side surface 56 | 113.848 | 0.567 | | | |
| Sixth lens element 6 | First side surface 65 | -1.684 | 0.180 | 1.642 | 22.409 | 5.489 |
| | Second side surface 66 | -1.194 | 0.294 | | | |
| Multi-light source generating unit 15 | Reference surface 100a | Infinity | | | | |

FIG. 33

| Surface | K | $a_2$ | $a_4$ | $a_6$ | $a_8$ |
|---|---|---|---|---|---|
| 15 | -3.651417E-01 | 0.000000E+00 | -7.845551E-02 | 9.534854E-03 | -1.215686E-01 |
| 16 | 2.083413E-01 | 0.000000E+00 | -2.435289E-01 | 1.070651E-01 | -1.835664E-01 |
| 25 | -4.571863E-01 | 0.000000E+00 | -1.799677E-01 | 2.023791E-01 | -1.503190E-01 |
| 26 | -2.537698E-01 | 0.000000E+00 | -1.496428E-01 | 3.822884E-02 | 6.046892E-03 |
| 35 | -6.611833E+00 | 0.000000E+00 | -1.062742E-01 | -2.632974E-02 | 2.998327E-02 |
| 36 | 4.980018E+01 | 0.000000E+00 | -1.307770E-01 | 4.146217E-02 | -9.462835E-02 |
| 45 | 5.921371E+00 | 0.000000E+00 | -2.377074E-01 | 3.048913E-01 | -4.876112E-01 |
| 46 | -1.979522E+02 | 0.000000E+00 | -1.539767E-01 | 1.961525E-01 | -1.268600E-01 |
| 55 | 4.492957E+01 | 0.000000E+00 | -2.637755E-01 | 1.076389E-01 | -1.628908E-02 |
| 56 | -7.429911E+01 | 0.000000E+00 | -1.183526E-01 | -2.376288E-02 | 6.434607E-02 |
| 65 | -4.478035E-01 | 0.000000E+00 | -1.716458E-01 | 9.971959E-02 | -1.199717E-02 |
| 66 | -3.088186E+31 | 0.000000E+00 | -1.801956E-01 | 1.181342E-01 | -4.696769E-02 |
| Surface | $a_{10}$ | $a_{12}$ | $a_{14}$ | $a_{16}$ | $a_{18}$ |
| 15 | 7.635614E-02 | 3.797703E-02 | -8.181118E-02 | 3.627150E-02 | |
| 16 | 5.784943E-02 | 2.860237E-02 | -2.936726E-02 | 5.926646E-03 | |
| 25 | 7.557330E-02 | -1.616076E-02 | -5.434886E-03 | 2.662092E-03 | |
| 26 | 6.501116E-02 | -4.813071E-02 | -1.892272E-03 | 4.879954E-03 | |
| 35 | 2.643942E-02 | -9.219325E-03 | -9.652306E-03 | 4.805213E-03 | |
| 36 | 7.509270E-02 | 1.699701E-02 | -4.512550E-02 | 1.656165E-02 | |
| 45 | 4.303853E-01 | -2.603315E-01 | 2.498684E-02 | 2.615555E-02 | |
| 46 | 3.245723E-02 | -1.458655E-02 | -3.891303E-02 | 3.421333E-02 | |
| 55 | 4.189547E-02 | -3.074623E-02 | -4.082986E-02 | 2.920327E-02 | |
| 56 | -3.912180E-02 | 7.729431E-03 | 1.630745E-03 | -6.382211E-04 | |
| 65 | -7.528595E-04 | 3.909238E-04 | -1.161323E-04 | 1.229902E-05 | |
| 66 | 9.382150E-03 | 1.301347E-04 | -4.515711E-04 | 5.986018E-05 | |

FIG. 34

| Eighth embodiment | | | | | | |
|---|---|---|---|---|---|---|
| Effective focal length (EFL) = 4.024 mm, Half field of view (HFOV) = 30.348°, System length (TTL) = 4.468 mm, F-number (Fno) = 2.012, Light circle radius (LCR) = 1.926 mm | | | | | | |
| Element | Surface | Radius (mm) | Thickness (mm) | Refractive index | Abbe number | Focal length (mm) |
| Object | | Infinity | Infinity | | | |
| Aperture 0 | | Infinity | 0.000 | | | |
| First lens element 1 | First side surface 15 | 1.745 | 0.198 | 1.661 | 20.373 | -9.894 |
| | Second side surface 16 | 1.320 | 0.024 | | | |
| Second lens element 2 | First side surface 25 | 1.418 | 0.483 | 1.529 | 76.976 | 3.960 |
| | Second side surface 26 | 3.843 | 0.390 | | | |
| Third lens element 3 | First side surface 35 | 4.191 | 0.370 | 1.566 | 37.426 | 8.435 |
| | Second side surface 36 | 31.140 | 0.370 | | | |
| Fourth lens element 4 | First side surface 45 | 3.320 | 0.221 | 1.661 | 20.373 | 23.140 |
| | Second side surface 46 | 4.107 | 0.284 | | | |
| Fifth lens element 5 | First side surface 55 | 7.922 | 0.457 | 1.661 | 20.373 | 15.415 |
| | Second side surface 56 | 32.807 | 1.052 | | | |
| Sixth lens element 6 | First side surface 65 | -1.562 | 0.199 | 1.642 | 22.409 | -2.542 |
| | Second side surface 66 | -28.411 | 0.418 | | | |
| Multi-light source generating unit 15 | Reference surface 100a | Infinity | | | | |

FIG. 37

| Surface | K | $a_2$ | $a_4$ | $a_6$ | $a_8$ |
|---|---|---|---|---|---|
| 15 | -4.945612E-01 | 0.000000E+00 | -7.850186E-02 | -2.036878E-03 | -1.197963E-01 |
| 16 | 1.998359E-01 | 0.000000E+00 | -2.318977E-01 | 9.425511E-02 | -1.795898E-01 |
| 25 | -4.339248E-01 | 0.000000E+00 | -1.846786E-01 | 2.105763E-01 | -1.497668E-01 |
| 26 | 3.180437E+00 | 0.000000E+00 | -1.246123E-01 | 2.969651E-02 | 4.650722E-03 |
| 35 | -4.297582E+00 | 0.000000E+00 | -9.900052E-02 | -3.398108E-02 | 2.485364E-02 |
| 36 | -1.432111E+02 | 0.000000E+00 | -1.370410E-01 | 3.843276E-02 | -8.961790E-02 |
| 45 | 4.563103E+00 | 0.000000E+00 | -2.285728E-01 | 3.063369E-01 | -4.797462E-01 |
| 46 | -1.119150E+02 | 0.000000E+00 | -1.387099E-01 | 1.799395E-01 | -1.142823E-01 |
| 55 | 2.023451E+01 | 0.000000E+00 | -3.106401E-01 | 1.195321E-01 | -2.526362E-03 |
| 56 | 5.521738E+01 | 0.000000E+00 | -1.713956E-01 | 1.800009E-02 | 5.878367E-02 |
| 65 | -5.527386E-01 | 0.000000E+00 | -1.728699E-01 | 1.024406E-01 | -1.176152E-02 |
| 66 | 1.446177E+02 | 0.000000E+00 | -2.283384E-01 | 1.250326E-01 | -4.764216E-02 |
| Surface | $a_{10}$ | $a_{12}$ | $a_{14}$ | $a_{16}$ | $a_{18}$ |
| 15 | 7.941973E-02 | 4.197834E-02 | -7.301148E-02 | 2.834852E-02 | |
| 16 | 6.190589E-02 | 2.978018E-02 | -2.967733E-02 | 4.738008E-03 | |
| 25 | 7.381257E-02 | -1.558887E-02 | -4.305647E-03 | 2.666289E-03 | |
| 26 | 6.821721E-02 | -4.546579E-02 | -9.029037E-04 | 4.353522E-03 | |
| 35 | 2.646093E-02 | -7.881016E-03 | -8.019203E-03 | 3.699936E-03 | |
| 36 | 7.707516E-02 | 1.570001E-02 | -4.645946E-02 | 1.679604E-02 | |
| 45 | 4.345665E-01 | -2.657961E-01 | 2.338680E-02 | 2.982207E-02 | |
| 46 | 3.741679E-02 | -1.811697E-02 | -4.264999E-02 | 3.402576E-02 | |
| 55 | 4.807243E-02 | -2.801641E-02 | -4.227888E-02 | 2.431174E-02 | |
| 56 | -3.991898E-02 | 7.984388E-03 | 1.677183E-03 | -7.815263E-04 | |
| 65 | -6.713329E-04 | 2.646600E-04 | -1.364369E-04 | 2.565050E-05 | |
| 66 | 9.225387E-03 | 2.652113E-04 | -4.654403E-04 | 5.905824E-05 | |

FIG. 38

| Ninth embodiment |||||||
|---|---|---|---|---|---|---|
| Effective focal length (EFL) = 3.418 mm, Half field of view (HFOV) = 36.307°, System length (TTL) = 4.281 mm, F-number (Fno) = 1.709, Light circle radius (LCR) = 2.140 mm |||||||
| Element | Surface | Radius (mm) | Thickness (mm) | Refractive index | Abbe number | Focal length (mm) |
| Object | | Infinity | Infinity | | | |
| Aperture 0 | | Infinity | 0.000 | | | |
| First lens element 1 | First side surface 15 | 1.639 | 0.199 | 1.661 | 20.373 | -20.807 |
| | Second side surface 16 | 1.396 | 0.145 | | | |
| Second lens element 2 | First side surface 25 | 1.730 | 1.014 | 1.553 | 71.685 | 4.171 |
| | Second side surface 26 | 5.382 | 0.200 | | | |
| Third lens element 3 | First side surface 35 | 2.384 | 0.422 | 1.566 | 37.426 | 4.636 |
| | Second side surface 36 | 22.382 | 0.202 | | | |
| Fourth lens element 4 | First side surface 45 | 3.551 | 0.257 | 1.661 | 20.373 | 13.125 |
| | Second side surface 46 | 5.768 | 0.359 | | | |
| Fifth lens element 5 | First side surface 55 | -5.082 | 0.649 | 1.661 | 20.373 | -29.616 |
| | Second side surface 56 | -7.174 | 0.319 | | | |
| Sixth lens element 6 | First side surface 65 | -1.612 | 0.227 | 1.642 | 22.409 | -1.470 |
| | Second side surface 66 | 2.497 | 0.289 | | | |
| Multi-light source generating unit 15 | Reference surface 100a | Infinity | | | | |

FIG. 41

| Surface | K | $a_2$ | $a_4$ | $a_6$ | $a_8$ |
|---|---|---|---|---|---|
| 15 | -1.351996E+00 | 0.000000E+00 | -1.282979E-01 | 5.996760E-02 | -1.277273E-01 |
| 16 | 2.070405E-01 | 0.000000E+00 | -2.542091E-01 | 1.461296E-01 | -1.865105E-01 |
| 25 | -2.224848E-05 | 0.000000E+00 | -9.018088E-02 | 1.679490E-01 | -1.553427E-01 |
| 26 | -7.577438E+01 | 0.000000E+00 | -1.075032E-01 | 6.375774E-02 | -1.399415E-02 |
| 35 | -6.985365E+00 | 0.000000E+00 | -9.099618E-02 | -3.007321E-02 | 3.991051E-02 |
| 36 | 5.211834E+01 | 0.000000E+00 | -1.175804E-01 | 3.472268E-02 | -7.732578E-02 |
| 45 | 3.961819E+00 | 0.000000E+00 | -2.349508E-01 | 2.873234E-01 | -4.417439E-01 |
| 46 | -1.101243E+02 | 0.000000E+00 | -1.461215E-01 | 1.738426E-01 | -1.312915E-01 |
| 55 | 6.558992E+00 | 0.000000E+00 | -2.343888E-01 | 9.250197E-02 | -1.240061E-02 |
| 56 | 1.126438E+01 | 0.000000E+00 | -1.428537E-01 | -2.046954E-02 | 6.262682E-02 |
| 65 | -2.599127E-01 | 0.000000E+00 | -1.532720E-01 | 8.620134E-02 | -1.725543E-02 |
| 66 | -2.067488E+32 | 0.000000E+00 | -1.337969E-01 | 1.021316E-01 | -4.561860E-02 |
| Surface | $a_{10}$ | $a_{12}$ | $a_{14}$ | $a_{16}$ | $a_{18}$ |
| 15 | 6.658738E-02 | 4.462279E-02 | -7.109056E-02 | 2.621298E-02 | |
| 16 | 5.787435E-02 | 3.086816E-02 | -2.908438E-02 | 5.239491E-03 | |
| 25 | 7.585607E-02 | -1.283855E-02 | -3.333634E-03 | 1.237273E-03 | |
| 26 | 5.892524E-02 | -4.142482E-02 | 2.990499E-03 | 2.095461E-03 | |
| 35 | 3.483672E-02 | -1.190712E-02 | -1.603313E-02 | 4.450146E-03 | |
| 36 | 8.290648E-02 | 1.213845E-02 | -5.037473E-02 | 1.705565E-02 | |
| 45 | 4.287664E-01 | -2.760716E-01 | 2.234566E-02 | 2.958677E-02 | |
| 46 | 4.019009E-02 | -1.109931E-02 | -4.157420E-02 | 3.141611E-02 | |
| 55 | 3.987220E-02 | -2.459110E-02 | -3.508658E-02 | 2.343418E-02 | |
| 56 | -3.816736E-02 | 8.025978E-03 | 1.539114E-03 | -7.077397E-04 | |
| 65 | -3.979238E-04 | 1.668820E-03 | 2.431201E-04 | -1.089594E-04 | |
| 66 | 9.483310E-03 | 1.818186E-04 | -4.330603E-04 | 5.423341E-05 | |

FIG. 42

| Expression | First embodiment | Second embodiment | Third embodiment | Fourth embodiment | Fifth embodiment |
|---|---|---|---|---|---|
| TL | 3.947 | 5.103 | 3.900 | 3.636 | 3.928 |
| TTL | 4.611 | 5.123 | 4.263 | 4.088 | 4.323 |
| ALT | 2.302 | 3.629 | 2.682 | 2.134 | 2.693 |
| AAG | 1.645 | 1.475 | 1.218 | 1.501 | 1.235 |
| BFL | 0.664 | 0.020 | 0.363 | 0.452 | 0.395 |
| $T_{avg}$ | 0.384 | 0.605 | 0.447 | 0.356 | 0.449 |
| $T_{max}$ | 0.578 | 0.907 | 0.733 | 0.534 | 0.706 |
| $T_{min}$ | 0.190 | 0.292 | 0.316 | 0.236 | 0.270 |
| V1+V2+V6 | 98.494 | 114.466 | 98.494 | 98.494 | 98.494 |
| EFL*Fno/D11t22 | 4.300 | 7.745 | 4.928 | 5.561 | 5.328 |
| TTL*Fno/D22t62 | 2.265 | 3.341 | 2.592 | 2.684 | 2.733 |
| T2/$T_{avg}$ | 1.505 | 1.500 | 1.641 | 1.501 | 1.573 |
| TTL/AAG | 2.803 | 3.474 | 3.500 | 2.723 | 3.500 |
| TL/(G23+G34+G45+G56) | 2.537 | 3.562 | 3.396 | 2.574 | 3.402 |
| ALT/(T1+T2) | 3.000 | 2.813 | 2.502 | 2.238 | 2.508 |
| D11t32/(G34+G56) | 2.041 | 2.666 | 2.645 | 2.140 | 3.799 |
| TTL/EFL | 1.899 | 1.222 | 1.271 | 1.201 | 1.233 |
| TL*Fno/EFL | 2.467 | 2.993 | 1.950 | 1.818 | 1.964 |
| ALT36/(G45+G56) | 1.943 | 2.425 | 2.383 | 1.601 | 2.499 |
| D11t32/(G34+G45) | 2.765 | 3.946 | 5.098 | 2.725 | 3.574 |
| (ALT+BFL)/D31t51 | 2.294 | 2.583 | 2.857 | 2.225 | 2.518 |
| ($T_{max}$+$T_{min}$)/G34 | 2.401 | 6.000 | 5.665 | 2.334 | 5.119 |
| ALT46/T3 | 3.094 | 3.100 | 3.099 | 3.100 | 2.803 |
| (T1+G12+T2)/G23 | 1.920 | 4.958 | 3.970 | 3.023 | 3.653 |
| ALT/(T2+T3) | 2.417 | 2.456 | 2.381 | 2.597 | 2.379 |
| TTL/D31t51 | 3.567 | 3.627 | 4.000 | 3.516 | 3.525 |
| (D11t22+BFL)/$T_{max}$ | 2.633 | 1.490 | 2.052 | 2.799 | 2.194 |

FIG. 43

| Expression | Sixth embodiment | Seventh embodiment | Eight embodiment | Ninth embodiment |
|---|---|---|---|---|
| TL | 3.147 | 3.903 | 4.050 | 3.993 |
| TTL | 3.430 | 4.197 | 4.468 | 4.281 |
| ALT | 2.042 | 2.582 | 1.930 | 2.768 |
| AAG | 1.105 | 1.321 | 2.121 | 1.224 |
| BFL | 0.283 | 0.294 | 0.418 | 0.289 |
| $T_{avg}$ | 0.340 | 0.430 | 0.322 | 0.461 |
| $T_{max}$ | 0.518 | 0.718 | 0.483 | 1.014 |
| $T_{min}$ | 0.099 | 0.180 | 0.198 | 0.199 |
| V1+V2+V6 | 98.494 | 90.012 | 119.757 | 114.466 |
| EFL*Fno/D11t22 | 4.746 | 4.414 | 11.480 | 4.302 |
| TTL*Fno/D22t62 | 2.207 | 2.009 | 2.688 | 2.777 |
| T2/$T_{avg}$ | 1.523 | 1.510 | 1.502 | 2.197 |
| TTL/AAG | 3.104 | 3.178 | 2.107 | 3.497 |
| TL/(G23+G34+G45+G56) | 2.969 | 3.027 | 1.932 | 3.699 |
| ALT/(T1+T2) | 2.419 | 2.898 | 2.833 | 2.282 |
| D11t32/(G34+G56) | 2.611 | 2.048 | 1.031 | 3.800 |
| TTL/EFL | 1.181 | 1.471 | 1.110 | 1.252 |
| TL*Fno/EFL | 1.574 | 1.951 | 2.025 | 1.996 |
| ALT36/(G45+G56) | 1.904 | 1.986 | 0.935 | 2.296 |
| D11t32/(G34+G45) | 2.916 | 3.149 | 2.240 | 3.530 |
| (ALT+BFL)/D31t51 | 1.927 | 2.182 | 1.884 | 2.465 |
| ($T_{max}$+$T_{min}$)/G34 | 3.096 | 3.732 | 1.840 | 5.996 |
| ALT46/T3 | 3.059 | 2.161 | 2.372 | 2.684 |
| (T1+G12+T2)/G23 | 3.841 | 4.685 | 1.809 | 6.798 |
| ALT/(T2+T3) | 2.510 | 2.179 | 2.261 | 1.928 |
| TTL/D31t51 | 2.843 | 3.184 | 3.586 | 3.453 |
| (D11t22+BFL)/$T_{max}$ | 2.262 | 1.694 | 2.326 | 1.624 |

FIG. 44

OPTICAL LENS ASSEMBLY

CROSS-REFERENCE TO RELATED APPLICATION

This application is a continuation application of and claims the priority benefit of U.S. application Ser. No. 17/115,796, filed on Dec. 9, 2020, which claims the priority benefit of China application serial no. 202011015295.1, filed on Sep. 24, 2020. The entirety of each of the above-mentioned patent applications is hereby incorporated by reference herein and made a part of this specification.

BACKGROUND

Technical Field

This disclosure relates to an optical lens assembly.

Description of Related Art

The specifications of portable electronic devices have undergone rapid development and progression with new updates constantly, and in turn, the key component, the optical lens assembly, has also become more diverse. With the upsurge of virtual reality (VR)/augmented reality (AR), the development of head-mounted wearable equipment and peripheral devices has also accelerated. Therefore, in addition to being configured for photo taking and video recording, the optical lens assembly may also be designed to utilize the principle of optical reflection to project information or images on a lens of the head-mounted wearable equipment, and achieve the effect of augmented reality through the projection of the information or the images into the eyes of the user by reflection.

However, not only does the projection light sources of different colors have different wavebands, the optical lens assembly also needs to be suitable for usage under different ambient temperatures, so as to prevent the information or the images from being affected by the ambient temperature and become unrecognizable. Moreover, the information or the images projected by the optical lens assembly are not only suitable for usage in dark places, but are also suitable for usage in various environments such as indoors or outdoors. Therefore, how to design an optical lens assembly with a small size, a large aperture, high thermal stability, and can be simultaneously applied to light sources of different wavebands remains a major challenge in the industry.

SUMMARY

This disclosure provides an optical lens assembly, which can maintain good optical quality while allowing light of multiple wavelengths to pass through, has a short system length, a large aperture, and good thermal stability.

An embodiment of the disclosure provides an optical lens assembly, which sequentially includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. The first lens element has negative refracting power. An optical axis region of the second side surface of the fourth lens element is concave. The lens elements of the optical lens assembly are the above six lens elements, and satisfies the following conditional expressions: $V1+V2+V6 \leq 120.000$ and $EFL*Fno/D11t22 \leq 11.500$, where V1 is the Abbe number of the first lens element, V2 is the Abbe number of the second lens element, V6 is the Abbe number of the sixth lens element, EFL is an effective focal length of the optical lens assembly, Fno is an f-number of the optical lens assembly, and D11t22 is a distance from the first side surface of the first lens element to the second side surface of the second lens element on the optical axis.

An embodiment of the disclosure provides an optical lens assembly, which sequentially includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. The first lens element has negative refracting power and an optical axis region of the first side surface of the first lens element is convex. The second lens element has positive refracting power. An optical axis region of the first side surface of the fourth lens element is convex. The lens elements of the optical lens assembly are the above six lens elements, and satisfies the following conditional expressions: $V1+V2+V6 \leq 120.000$ and $EFL*Fno/D11t22 \leq 11.500$, where V1 is the Abbe number of the first lens element, V2 is the Abbe number of the second lens element, V6 is the Abbe number of the sixth lens element, EFL is an effective focal length of the optical lens assembly, Fno is an f-number of the optical lens assembly, and D11t22 is a distance from the first side surface of the first lens element to the second side surface of the second lens element on the optical axis.

An embodiment of the disclosure provides an optical lens assembly, which sequentially includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. The first lens element has negative refracting power. The second lens element has positive refracting power. An optical axis region of the first side surface of the fourth lens element is convex. A periphery region of the second side surface of the sixth lens element is convex. The lens elements of the optical lens assembly are the above six lens elements, and satisfies the following conditional expressions: $V1+V2+V6 \leq 120.000$ and $EFL*Fno/D11t22 \leq 11.500$, where V1 is the Abbe number of the first lens element, V2 is the Abbe number of the second lens element, V6 is the Abbe number of the sixth lens element, EFL is an effective focal length of the optical lens assembly, Fno is an f-number of the optical lens assembly, and D11t22 is a distance from the first side surface of the first lens element to the second side surface of the second lens element on the optical axis.

An embodiment of the disclosure provides an optical lens assembly, which sequentially includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. The first lens element has negative refracting power, and satisfies the conditional expressions of V1+V2+V6≤120.000 and EFL*Fno/D11t22≤8.100, and collocates with any one of the following surface shape and refracting power combinations:

an optical axis region of the second side surface of the fifth lens element is concave; or the second lens element has positive refracting power, and an optical axis region of the first side surface of the fifth lens element is convex.

An embodiment of the disclosure provides an optical lens assembly, which sequentially includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. An optical axis region of the second side surface of the second lens is concave, an optical axis region of the second side surface of the fifth lens is concave, and satisfies the following conditional expression: $T2/T_{avg} \geq 1.500$, and further collocates with any one of the following conditions. The first lens element has negative refracting power; the third lens element has positive refracting power; a periphery region of the first side surface of the fourth lens element is concave; an optical axis region of the second side surface of the fourth lens element is concave; the fifth lens element has positive refracting power; an optical axis region of the first side surface of the fifth lens element is convex; the sixth lens element has negative refracting power; an optical axis region of the first side surface of the sixth lens element is concave; a periphery region of the first side surface of the sixth lens element is concave; or an optical axis region of the second side surface of the sixth lens element is convex.

An embodiment of the disclosure provides an optical lens assembly, which includes an aperture, a first lens element, a second lens element, a third lens element, a fourth lens element, a fifth lens element, and a sixth lens element from a first side to a second side along an optical axis. The first side is a light-exiting side or an object side. The second side is a light-incident side or an image side. Each of the first lens element to the sixth lens element includes a first side surface that faces the first side and allows an imaging ray to pass through, and a second side surface that faces the second side and allows an imaging ray to pass through. The first lens element has negative refracting power, an optical axis region of the first side surface of the first lens element is convex, the second lens element has positive refracting power, an optical axis region of the second side surface of the second lens element is concave, the third lens element has positive refracting power, an optical axis region of the second side surface of the fifth lens element is concave, and satisfies the following conditional expression: TTL*Fno/D22t62≤3.400, and further collocates with any one of the following conditions. An optical axis region of the first side surface of the fourth lens element is convex; an optical axis region of the second side surface of the fourth lens element is concave; the sixth lens element has negative refracting power; an optical axis region of the first side surface of the sixth lens element is concave; or an optical axis region of the second side surface of the sixth lens element is convex.

In the optical lens assembly according to the embodiment of the disclosure, an absolute value of the focus shift at a temperature of 0° C. to 70° C. is less than or equal to 0.030 mm.

Based on the above, the optical lens assembly according to the embodiment of the disclosure has at least one of the following advantages. The optical lens assembly can still maintain good optical quality, shorten the system length, being technically feasible, and has good thermal stability while allowing light of multiple wavelengths to pass through by having a design that satisfies the above concave-convex curved surface arrangement of the lens elements, the conditions of the refracting powers, and a design that satisfies the above conditional expressions.

BRIEF DESCRIPTION OF THE DRAWINGS

FIG. 9 shows the detailed optical data of the optical lens assembly according to the first embodiment of the disclosure.

FIG. 10 shows the aspheric parameters of the optical lens assembly according to the first embodiment of the disclosure.

FIG. 13 shows the detailed optical data of the optical lens assembly according to the second embodiment of the disclosure.

FIG. 14 shows the aspheric parameters of the optical lens assembly according to the second embodiment of the disclosure.

FIG. 17 shows the detailed optical data of the optical lens assembly according to the third embodiment of the disclosure.

FIG. 18 shows the aspheric parameters of the optical lens assembly according to the third embodiment of the disclosure.

FIG. 19 is a schematic view of an optical lens assembly according to a fourth embodiment of the disclosure.

FIGS. 20A to 20D are views of the longitudinal spherical aberration and various aberrations of the optical lens assembly according to the fourth embodiment.

FIG. 21 shows the detailed optical data of the optical lens assembly according to the fourth embodiment of the disclosure.

FIG. 22 shows the aspheric parameters of the optical lens assembly according to the fourth embodiment of the disclosure.

FIG. 23 is a schematic view of an optical lens assembly according to a fifth embodiment of the disclosure.

FIGS. 24A to 24D are views of the longitudinal spherical aberration and various aberrations of the optical lens assembly according to the fifth embodiment.

FIG. 25 shows the detailed optical data of the optical lens assembly according to the fifth embodiment of the disclosure.

FIG. 26 shows the aspheric parameters of the optical lens assembly according to the fifth embodiment of the disclosure.

FIG. 29 shows the detailed optical data of the optical lens assembly according to the sixth embodiment of the disclosure.

FIG. 30 shows the aspheric parameters of the optical lens assembly according to the sixth embodiment of the disclosure.

FIG. 33 shows the detailed optical data of the optical lens assembly according to the seventh embodiment of the disclosure.

FIG. 34 shows the aspheric parameters of the optical lens assembly according to the seventh embodiment of the disclosure.

FIG. 37 shows the detailed optical data of the optical lens assembly according to the eighth embodiment of the disclosure.

FIG. 38 shows the aspheric parameters of the optical lens assembly according to the eighth embodiment of the disclosure.

FIG. 41 shows the detailed optical data of the optical lens assembly according to the ninth embodiment of the disclosure.

FIG. 42 shows the aspheric parameters of the optical lens assembly according to the ninth embodiment of the disclosure.

FIG. 43 shows the values of important parameters of the optical lens assembly and their relational values according to the first to the fifth embodiments of the disclosure.

FIG. 44 shows the values of important parameters of the optical lens assembly and their relational values according to the sixth to the ninth embodiments of the disclosure.

DESCRIPTION OF THE EMBODIMENTS

Figure 1A:
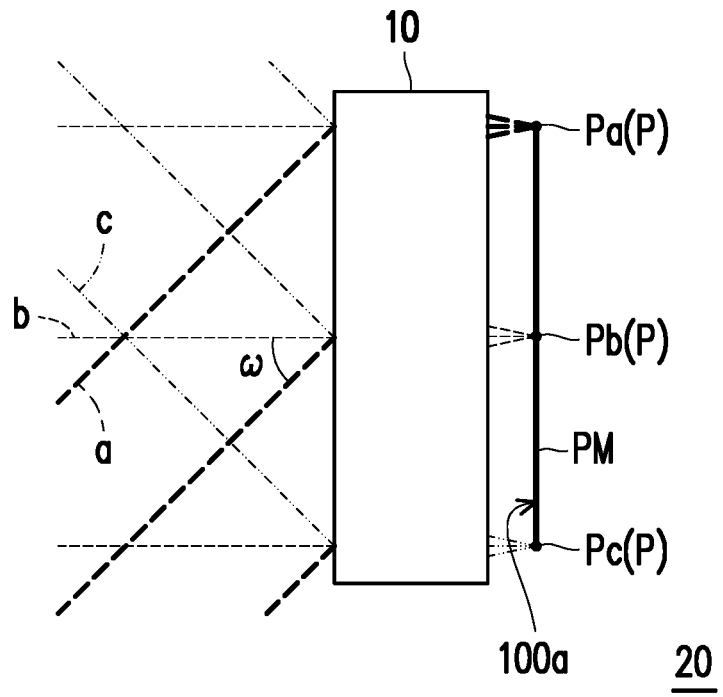
FIG. 1A is a schematic view illustrating an optical lens assembly of the disclosure when applied to a projection lens.

Referring to FIG. 1A, in an embodiment, an optical lens assembly 10 according to the embodiment of the disclosure is suitable for projection. A light direction of a projection lens 20 is composed of multiple imaging rays that are emitted by a multi-light source generating unit PM, and passed through the optical lens assembly 10 of the embodiment of the disclosure to generate multiple imaging rays a, b, and c with different exiting angles that are projected to the environment in front. A range of the light-exiting angles falls within a range of $-\omega$ degrees to $\omega$ degrees, where $\omega$ is a maximum half-light-exiting angle of the optical lens assembly 10. The imaging rays a, b, and c are not limited to any form of imaging rays, and directions of the imaging rays are being illustrated in the form of dotted lines. The number of the imaging rays a, b, and c is not limited to three, and the number may be any other number that is not equal to 3 and 1. The imaging rays a, b, and c are illustrated in FIG. 1A as a representation, in which the imaging rays a, b, and c respectively have a chief ray and marginal rays (not shown). The chief ray and the marginal rays of the imaging ray a are approximately parallel to each other. Similarly, the chief ray and the marginal rays of the imaging ray b are also approximately parallel to each other, and the chief ray and the marginal rays of the imaging ray c are also approximately parallel to each other. In detail, the imaging rays a, b, and c in FIG. 1A are respectively emitted by light sources Pa, Pb, and Pc at different positions in FIG. 1B. As seen from FIG. 1A, the imaging rays emitted by the light sources P at different positions will all exit from the optical lens assembly 10 in a parallel manner after passing through the optical lens assembly 10, but the exit directions will be different according to the positions. Taking FIG. 1A as an example, an imaging ray emitted by the light source Pa passes through the optical lens assembly 10 and then exits the optical lens assembly 10 (as shown by the imaging ray a) obliquely to the lower left while being parallel. An imaging ray emitted by the light source Pb at another position passes through the optical lens assembly 10 and then exits the optical lens assembly 10 (as shown by the imaging ray b) to the central left while being parallel. An imaging ray emitted by the light source Pc at another position passes through the optical lens assembly 10 and then exits the optical lens assembly 10 (as shown by the imaging ray c) obliquely to the upper left while being parallel.

Figure 1B:
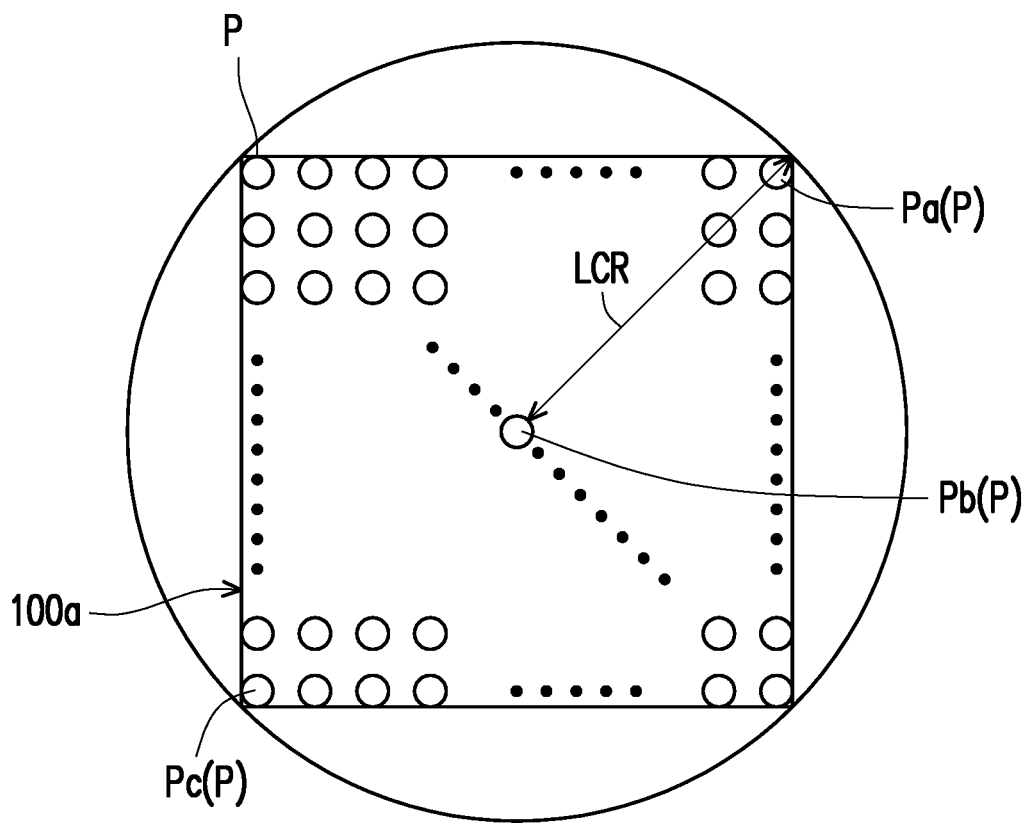
FIG. 1B is a front view of an embodiment of the multi-light source generating unit in FIG. 1A.

Referring to FIG. 1B, in an embodiment, the multi-light source generating unit PM includes the multiple light sources P arranged in an array. The light source P is, for example, a near-infrared light source or a green light source, but the disclosure is not limited thereto. In addition, in other embodiments, the arrangement of the light sources P may also be a circular arrangement or other arrangements, and the disclosure is not limited thereto. The type of the light source P is, for example, a laser diode, a light-emitting diode (LED), a mini light-emitting diode (mini LED) or a micro light-emitting diode (micro LED). A size range of the mini LED is, for example, within a range of 75 µm to 300 µm, and a size range of the micro LED is, for example, less than 75 µm. Light-emitting surfaces of these light sources P form a reference surface 100a. In an embodiment, the reference surface 100a is a light-emitting surface of the multi-light source generating unit PM.

It should be noted that if the optical lens assembly 10 according to the embodiment of the disclosure is used for projection, then the following describes a judgment criterion of an optical specification of the embodiment of the disclosure. It assumes that a light direction reversely tracking as a parallel imaging ray passing through the optical lens assembly 10 from a first side to the reference surface 100a on a second side to focus and form an image. The reference surface 100a is the light-emitting surface of the multi-light source generating unit PM, the second side is a side facing the multi-light source generating unit PM (that is, a light-incident side), and the first side is an opposite side (that is, a light-exiting side). In addition, if the optical lens assembly 10 according to the embodiment of the disclosure is used for projection, a second side surface of each lens element of the following optical lens assembly 10 refers to a surface facing the multi-light source generating unit PM (that is, a light-incident surface), and a first side surface of each of the lens elements of the following optical lens assembly 10 is an opposite surface (that is, a light-exiting surface).

If the optical lens assembly 10 according to the embodiment of the disclosure is used for imaging, then the following describes a judgment criterion of an optical specification of the embodiment of the disclosure. It assumes that a light direction tracking as a parallel imaging ray passing through the optical lens assembly 10 from the first side to the reference surface 100a on the second side to focus and form an image. The reference surface 100a is an image plane, the second side is a side facing the image plane (that is, an image side), and the first side is a side facing an object to be photographed (that is, the object side). In addition, if the optical lens assembly 10 according to the embodiment of the disclosure is used for imaging, the second side surface of each of the lens elements of the following optical lens assembly 10 refers to a surface facing the image plane (that is, a side surface), and a first side surface of each of the lens elements of the following optical lens assembly 10 refers to a surface facing the object to be photographed (that is, an object side surface).

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on a reference surface. The term "a lens element having positive refracting power (or negative refracting power)" means that the paraxial refracting power of the lens element in Gaussian optics is positive (or negative). The term "a first side (or second side) surface of a lens element" refers to a specific region of that surface of the lens element at which imaging rays can pass through that specific region. Imaging rays include at least two types of rays: a chief ray Lc and a marginal ray Lm (as shown in FIG. 1). A first side (or second side) surface of a lens element can be characterized as having several regions, including an optical axis region, a periphery region, and, in some cases, one or more intermediate regions, as discussed more fully below.

Figure 2:
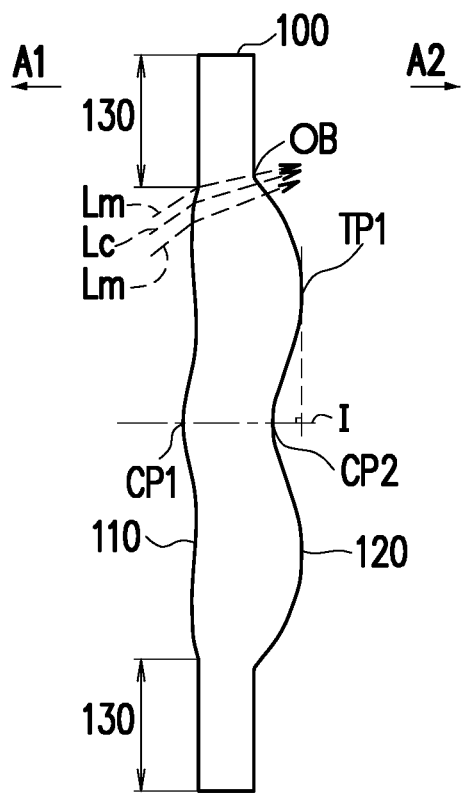
FIG. 2 is a schematic view illustrating a surface structure of a lens element.
Figure 5:
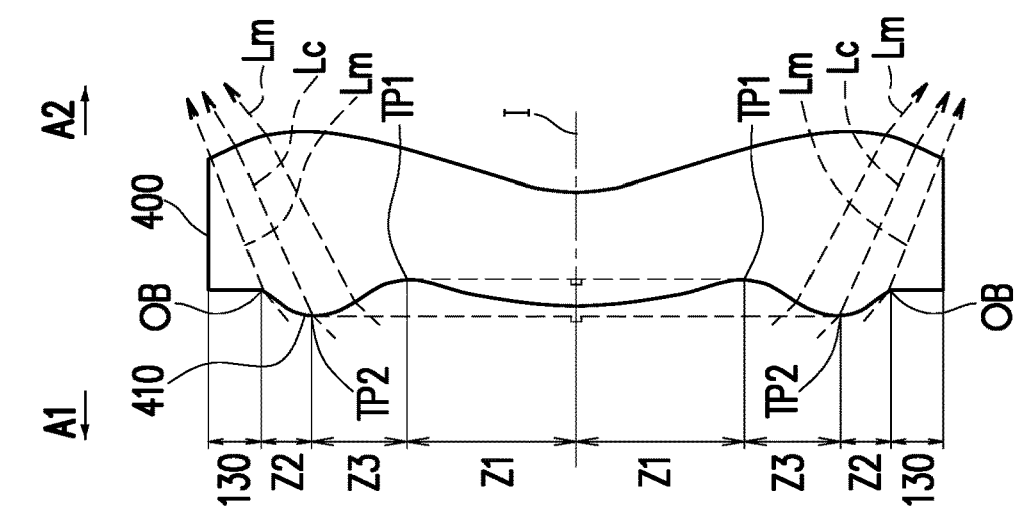
FIG. 5 is a schematic view illustrating a surface structure of a lens element of example 2.

FIG. 2 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 2, a first central point CP1 may be present on the first side surface 110 of lens element 100 and a second central point CP2 may be present on the second side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 5), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points The shape of a region is convex if a collimated ray being parallel to the optical axis I and passing through the region is bent toward the optical axis I such that the ray intersects the optical axis I on the second side A2 of the lens element. The shape of a region is concave if the extension line of a collimated ray being parallel to the optical axis I and passing through the region intersects the optical axis I on the first side A1 of the lens element.

Additionally, referring to FIG. 2, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 3:
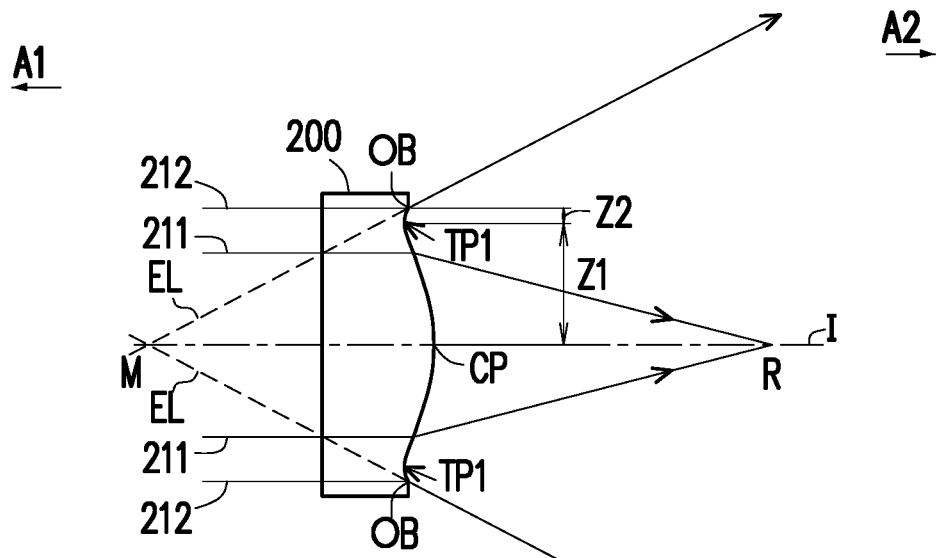
FIG. 3 is a schematic view illustrating a concave-convex surface structure and a focal point of light of a lens element.

Referring to FIG. 3, optical axis region Z1 is defined between central point CP and first transition point TP1. Periphery region Z2 is defined between TP1 and the optical boundary OB of the surface of the lens element. Collimated ray 211 intersects the optical axis I on the second side A2 of lens element 200 after passing through optical axis region Z1, i.e., the focal point of collimated ray 211 after passing through optical axis region Z1 is on the second side A2 of the lens element 200 at point R in FIG. 2. Accordingly, since the ray itself intersects the optical axis I on the second side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the first side A1 of lens element 200, i.e., the focal point of collimated ray 212 after passing through periphery region Z2 is on the first side A1 at point M in FIG. 2. Accordingly, since the extension line EL of the ray intersects the optical axis I on the first side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens element surface in the optical axis region. The R value is commonly used in conventional optical design software such as Zemax and CodeV. The R value usually appears in the lens element data sheet in the software. For a first side surface, a positive R value defines that the optical axis region of the first side surface is convex, and a negative R value defines that the optical axis region of the first side surface is concave. Conversely, for a second side surface, a positive R value defines that the optical axis region of the second side surface is concave, and a negative R value defines that the optical axis region of the second side surface is convex. The result found by using this method should be consistent with the method utilizing intersection of the optical axis by rays/extension lines mentioned above, which determines surface shape by referring to whether the focal point of a collimated ray being parallel to the optical axis I is on the first side or the second side of a lens element. As used herein, the terms "a shape of a region is convex (concave)," "a region is convex (concave)," and "a convex-(concave-) region," can be used alternatively.

Figure 6:
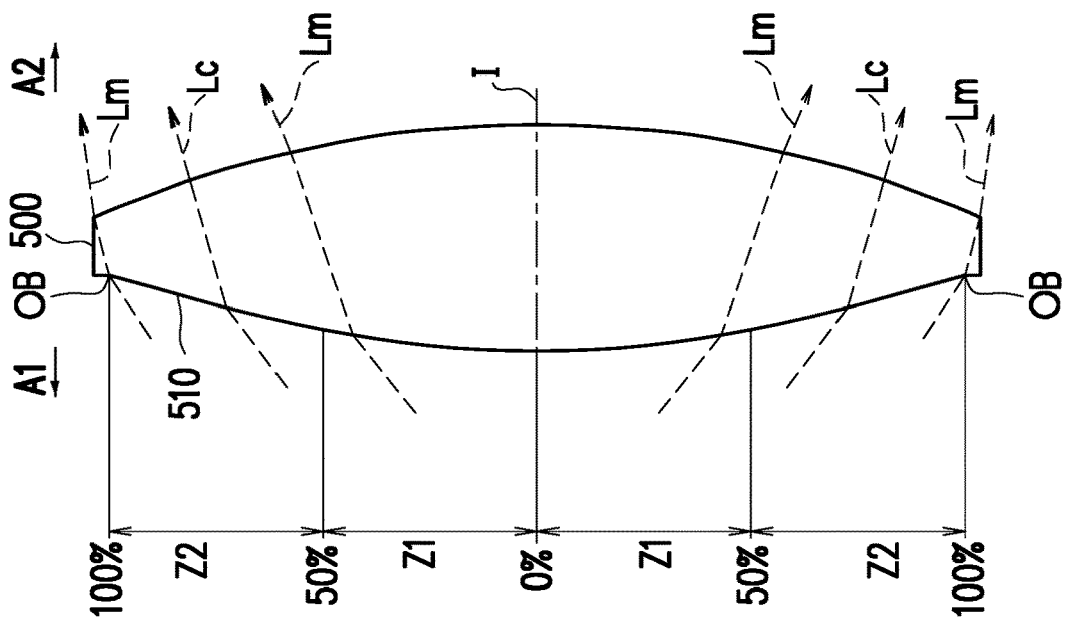
FIG. 6 is a schematic view illustrating a surface structure of a lens element of example 3.
Figure 4:
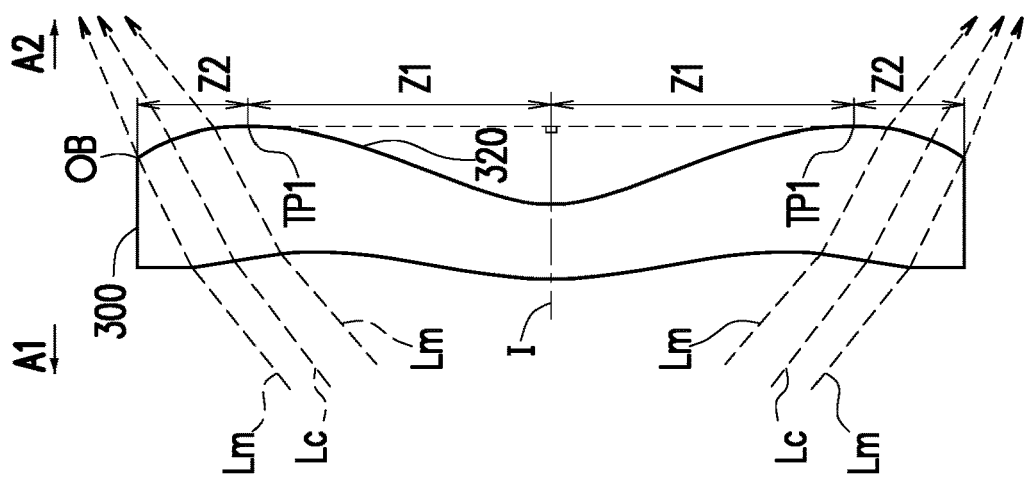
FIG. 4 is a schematic view illustrating a surface structure of a lens element of example 1.

FIG. 4, FIG. 5 and FIG. 6 illustrate examples of determining the shape of lens element regions and the boundaries of regions under various circumstances, including the optical axis region, the periphery region, and intermediate regions as set forth in the present specification.

FIG. 4 is a radial cross-sectional view of a lens element 300. As illustrated in FIG. 4, only one transition point TP1 appears within the optical boundary OB of the second side surface 320 of the lens element 300. Optical axis region Z1 and periphery region Z2 of the second side surface 320 of lens element 300 are illustrated. The R value of the second side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 4, since the shape of the optical axis region Z1 is concave, the shape of the periphery region Z2 will be convex as the shape changes at the transition point TP1.

FIG. 5 is a radial cross-sectional view of a lens element 400. Referring to FIG. 5, a first transition point TP1 and a second transition point TP2 are present on the first side surface 410 of lens element 400. The optical axis region Z1 of the first side surface 410 is defined between the optical axis I and the first transition point TP1. The R value of the first side surface 410 is positive (i.e., R>0). Accordingly, the optical axis region Z1 is convex.

The periphery region Z2 of the first side surface 410, which is also convex, is defined between the second transition point TP2 and the optical boundary OB of the first side surface 410 of the lens element 400. Further, intermediate region Z3 of the first side surface 410, which is concave, is defined between the first transition point TP1 and the second transition point TP2. Referring once again to FIG. 5, the first side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the first side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 6 is a radial cross-sectional view of a lens element 500. Lens element 500 has no transition point on the first side surface 510 of the lens element 500. For a surface of a lens element with no transition point, for example, the first side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 6, the optical axis region Z1 of the first side surface 510 is defined between the optical axis I and 50% of the distance between the optical axis I and the optical boundary OB. The R value of the first side surface 510 is positive (i.e., R>0). Accordingly, the optical axis region Z1 is convex. For the first side surface 510 of the lens element 500, because there is no transition point, the periphery region Z2 of the first side surface 510 is also convex. It should be noted that lens element 500 may have a mounting portion (not shown) extending radially outward from the periphery region Z2.

Figure 7:
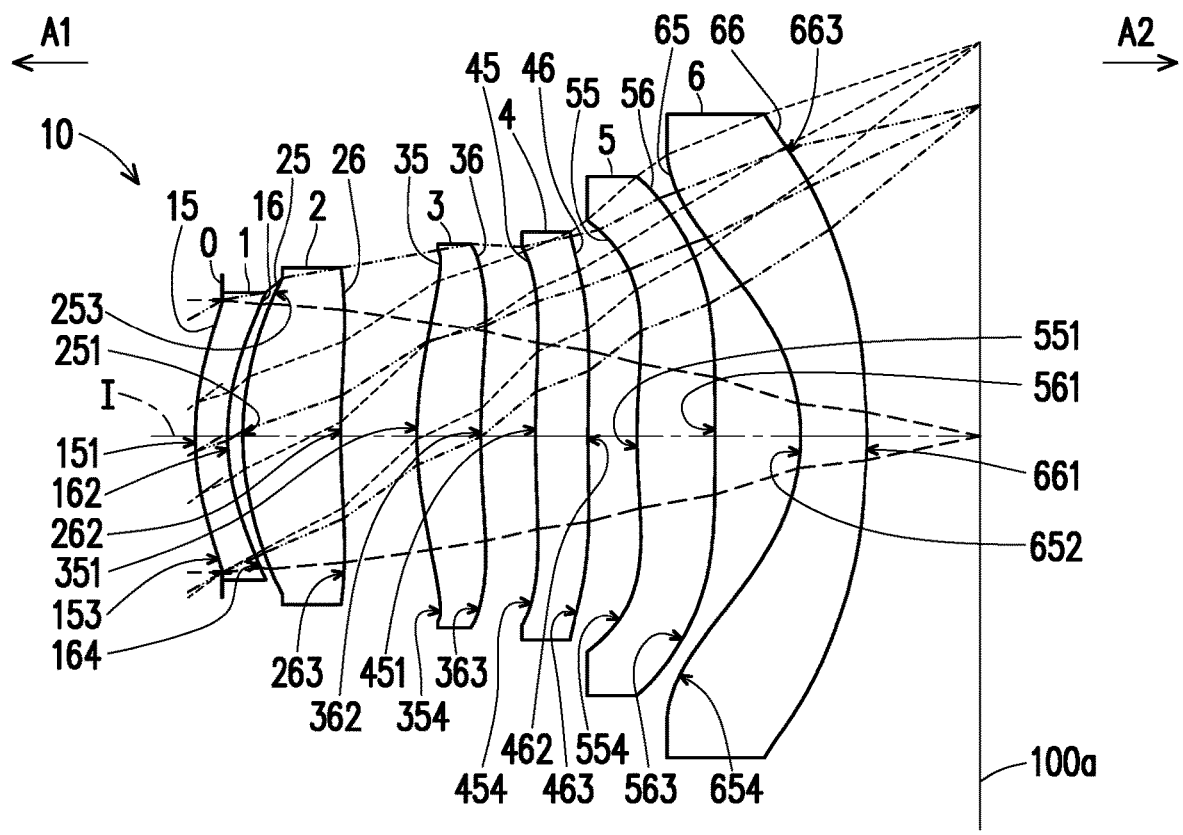
FIG. 7 is a schematic view of an optical lens assembly according to a first embodiment of the disclosure.

FIG. 7 is a schematic view of an optical lens assembly according to a first embodiment of the disclosure, and FIGS. 8A to 8D are views of the longitudinal spherical aberration and various aberrations of the optical lens assembly according to the first embodiment. Referring to FIG. 7 first, the optical lens assembly 10 according to the first embodiment of the disclosure sequentially includes an aperture 0, a first lens element 1, a second lens element 2, a third lens element 3, a fourth lens element 4, a fifth lens element 5 and a sixth lens element 6 from the first side A1 to the second side A2 along the optical axis I of the optical lens assembly 10. If the optical lens assembly 10 is used for projection, the multiple imaging rays are emitted from the reference surface 100a (that is, the light-emitting surface of the multi-light source generating unit PM) and enter the optical lens assembly 10. After the multiple imaging rays pass through the sixth lens element 6, the fifth lens element 5, the fourth lens element 4, the third lens element 3, the second lens element 2, the first lens element 1, and the aperture 0, the multiple imaging rays will be generated on the first side A1, and exit from the optical lens assembly 10. To further elaborate, in the embodiment, the second side A2 is the side facing the multi-light source generating unit PM, the first side A1 is the opposite side. The second side A2 is the light-incident side, and the first side A1 is the light-exiting side.

If the optical lens assembly 10 is used for imaging, when a light emitted by the object to be photographed enters the optical lens assembly 10, it will form an image on the reference surface 100a after sequentially passing through the aperture 0, the first lens element 1, the second lens element 2, the third lens element 3, the fourth lens element 4, the fifth lens element 5, and the sixth lens element 6. To further elaborate, in the embodiment, the second side A2 is a side facing the object to be photographed, and the first side A1 is the opposite side, that is, a side facing the reference surface (or image plane) 100a. The second side A2 is the object side, and the first side A1 is the image side.

The first lens element 1, the second lens element 2, the third lens element 3, the fourth lens element 4, the fifth lens element 5, and the sixth lens element 6 each respectively has a first side surface 15, 25, 35, 45, 55, 65, which faces the first side A1 and allows the imaging ray to pass through, and a second side surface 16, 26, 36, 46, 56, 66, which faces the second side A2 and allows the imaging ray to pass through.

In the embodiment, the materials of the first lens element 1, the second lens element 2, the third lens element 3, the fourth lens element 4, the fifth lens element 5, and the sixth lens element 6 are all plastic, but the disclosure is not limited thereto.

The first lens element 1 has negative refracting power. An optical axis region 151 of the first side surface 15 of the first lens element 1 is convex, and a periphery region 153 of the first side surface 15 of the first lens element 1 is convex. An optical axis region 162 of the second side surface 16 of the first lens element 1 is concave, and a periphery region 164 of the second side surface 16 of the first lens element 1 is concave. In the embodiment, both the first side surface 15 and the second side surface 16 of the first lens element 1 are aspherical.

The second lens element 2 has positive refracting power. An optical axis region 251 of the first side surface 25 of the second lens element 2 is convex, and a periphery region 253 of the first side surface 25 of the second lens element 2 is convex. An optical axis region 262 of the second side surface 26 of the second lens element 2 is concave, and a periphery region 263 of the second side surface 26 of the second lens element 2 is convex. In the embodiment, both the first side surface 25 and the second side surface 26 of the second lens element 2 are aspherical.

The third lens element 3 has positive refracting power. An optical axis region 351 of the first side surface 35 of the third lens element 3 is convex, and a periphery region 354 of the first side surface 35 of the third lens element 3 is concave. An optical axis region 362 of the second side surface 36 of the third lens element 3 is concave, and a periphery region 363 of the second side surface 36 of the third lens element 3 is convex. In the embodiment, both the first side surface 35 and the second side surface 36 of the third lens element 3 are aspherical.

The fourth lens element 4 has positive refracting power. An optical axis region 451 of the first side surface 45 of the fourth lens element 4 is convex, and a periphery region 454 of the first side surface 45 of the fourth lens element 4 is concave. An optical axis region 462 of the second side surface 46 of the fourth lens element 4 is concave, and a periphery region 463 of the second side surface 46 of the fourth lens element 4 is convex. In the embodiment, both the first side surface 45 and the second side surface 46 of the fourth lens element 4 are aspherical.

The fifth lens element 5 has positive refracting power. An optical axis region 551 of the first side surface 55 of the fifth lens element 5 is convex, and a periphery region 554 of the first side surface 55 of the fifth lens element 5 is concave. An optical axis region 561 of the second side surface 56 of the fifth lens element 5 is convex, and a periphery region 563 of the second side surface 56 of the fifth lens element 5 is convex. In the embodiment, both the first side surface 55 and the second side surface 56 of the fifth lens element 5 are aspherical.

The sixth lens element 6 has positive refracting power. An optical axis region 652 of the first side surface 65 of the sixth lens element 6 is concave, and a periphery region 654 of the first side surface 65 of the sixth lens element 6 is concave. An optical axis region 661 of the second side surface 66 of the sixth lens element 6 is convex, and a periphery region 663 of the second side surface 66 of the sixth lens element 6 is convex. In the embodiment, both the first side surface 65 and the second side surface 66 of the sixth lens element 6 are aspherical.

The optical lens assembly 10 according to the first embodiment has good thermal stability. Furthermore, under different ambient temperatures, the optical lens assembly 10 has a very small focal shift. For example, in an environment of 0° C., the focal shift of the optical lens assembly 10 is −0.011 mm; in an environment of 20° C., the focal shift of the optical lens assembly 10 is 0.000 mm; and in an environment of 70° C., the focal shift of the optical lens assembly 10 is 0.029 mm.

Other detailed optical data of the first embodiment is shown in FIG. 9, and an effective focal length (EFL) of the first embodiment is 2.428 mm, and the half field of view (HFOV) angle is 36.495°, and a system length (that is, TTL) is 4.611 mm, an f-number (Fno) is 1.518, a light circle radius (LCR) (or image height ImgH) is 2.308 mm. The system length refers to a distance on the optical axis I from the first side surface 15 of the first lens element 1 to the reference surface 100a. The "f-number" in the specification is an f-number calculated according to the principle of light reversibility, taking the aperture 0 as an incident pupil.

In addition, in the embodiment, the first side surfaces 15, 25, 35, 45, 55 and 65, and the second side surfaces 16, 26, 36, 46, 56, 66 of the first lens element 1, the second lens element 2, the third lens element 3, the fourth lens element 4, the fifth lens element 5, and the sixth lens element 6, these twelve surfaces are all aspherical, and these aspherical surfaces are defined by the following conditional expression (2):

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \quad (2)$$

where,
- Y: a distance between a point on the aspherical surface curvature and the optical axis I,
- Z: a depth of the aspherical surface (a vertical distance between the point Y from the optical axis I on the aspherical surface and the tangent to the vertex on the optical axis I of the aspherical surface),
- R: a radius of the lens element surface near the optical axis I,
- K: a conic constant, and
- $a_i$: the i-th aspheric coefficient.

The aspheric coefficients of the above aspherical surfaces in the conditional expression (2) are shown in FIG. 10. The field number 15 in FIG. 10 indicates that it is the aspheric coefficient of the first side surface 15 of the first lens element 1, and the other fields may be deduced by analogy accordingly.

In addition, relationships between the important parameters in the optical lens assembly 10 according to the first embodiment are shown in FIG. 43, where, f1 is a focal length of the first lens element 1,
f2 is a focal length of the second lens element 2,
f3 is a focal length of the third lens element 3,
f4 is a focal length of the fourth lens element 4,
f5 is a focal length of the fifth lens element 5,
f6 is a focal length of the sixth lens element 6,
V1 is the Abbe number of the first lens element 1, and the Abbe number may also be known as the dispersion coefficient,
V2 is the Abbe number of the second lens element 2,
V3 is the Abbe number of the third lens element 3,
V4 is the Abbe number of the fourth lens element 4,
V5 is the Abbe number of the fifth lens element 5,
V6 is the Abbe number of the sixth lens element 6,
T1 is a thickness of the first lens element 1 on the optical axis I,
T2 is a thickness of the second lens element 2 on the optical axis I,
T3 is a thickness of the third lens element 3 on the optical axis I,
T4 is a thickness of the fourth lens element 4 on the optical axis I,
T5 is a thickness of the fifth lens element 5 on the optical axis I,
T6 is a thickness of the sixth lens element 6 on the optical axis I,
G12 is an air gap between the first lens element 1 and the second lens element 2 on the optical axis I,
G23 is an air gap between the second lens element 2 and the third lens element 3 on the optical axis I,
G34 is an air gap between the third lens element 3 and the fourth lens element 4 on the optical axis I,
G45 is an air gap between the fourth lens element 4 and the fifth lens element 5 on the optical axis I,
G56 is an air gap between the fifth lens element 5 and the sixth lens element 6 on the optical axis I,
G6P is an air gap between the sixth lens element 6 and the reference surface 100a on the optical axis I,
D11t22 is a distance from the first side surface 15 of the first lens element 1 to the second side surface 26 of the second lens element 2 on the optical axis I,
D11t32 is a distance from the first side surface 15 of the first lens element 1 to the second side surface 36 of the third lens element 3 on the optical axis I,
D22t62 is a distance from the second side surface 26 of the second lens element 2 to the second side surface 66 of the sixth lens element 6 on the optical axis I,
D31t51 is a distance from the first side surface 35 of the third lens element 3 to the first side surface 55 of the fifth lens element 5 on the optical axis I,
AAG is the sum of the five air gaps of the first lens element 1 to the sixth lens element 6 on the optical axis I, that is, the sum of G12, G23, G34, G45 and G56,
ALT is the sum of the thicknesses of the six lens elements, from the first lens element 1 to the sixth lens element 6 on the optical axis I, that is, the sum of T1, T2, T3, T4, T5 and T6,
ALT36 is the sum of the four thicknesses, from the third lens element 3 to the sixth lens element 6 on the optical axis I, that is, the sum of T3, T4, T5 and T6,
ALT46 is the sum of the three thicknesses, from the fourth lens element 4 to the sixth lens element 6 on the optical axis I, that is, the sum of T4, T5 and T6,
EFL is the effective focal length of the optical lens assembly 10,
BFL is a distance from the second side surface 66 of the sixth lens element 6 to the reference surface 100a on the optical axis I, and the reference surface 100a is the light-emitting surface or the image plane,
TTL is a distance from the first side surface 15 of the first lens element 1 to the reference surface 100a on the optical axis I, and the reference surface 100a is the light-emitting surface or the image plane,
TL is a distance from the first side surface 15 of the first lens element 1 to the second side surface 66 of the sixth lens element 6 on the optical axis I,
$T_{max}$ is a thickness of a thickest lens element of the optical lens assembly 10 on the optical axis I,
$T_{min}$ is a thickness of a thinnest lens element of the optical lens assembly 10 on the optical axis I,
$T_{avg}$ is an average thickness of all of the lens elements 1 to 6 of the optical lens assembly 10 on the optical axis I,
HFOV is the half field of view angle of the optical lens assembly 10, and according to the principle of light reversibility, it is the maximum half-light-exiting angle ω of the optical lens assembly 10,
LCR (light circle radius) is a radius of an light-emitting circle (marked as LCR, as shown in FIG. 1B), which is a radius of the smallest circumscribed circle of the light-emitting surface (that is, the reference surface 100a) of the multi-light source generating unit, or when the optical lens assembly 10 is used for imaging, its value may also be the image height (ImgH) of the optical lens assembly 10, and
Fno is the f-number, which is calculated from an effective aperture of the imaging ray emitted by the optical lens assembly 10 according to the principle of light reversibility, and in the embodiment of the disclosure, the f-number is calculated by taking the aperture 0 as the incident pupil.

In FIGS. 43 and 44, units of the values from the TL column to the $T_{min}$ column are in millimeters (mm).

Figures 8A, 8B, 8C, 8D:
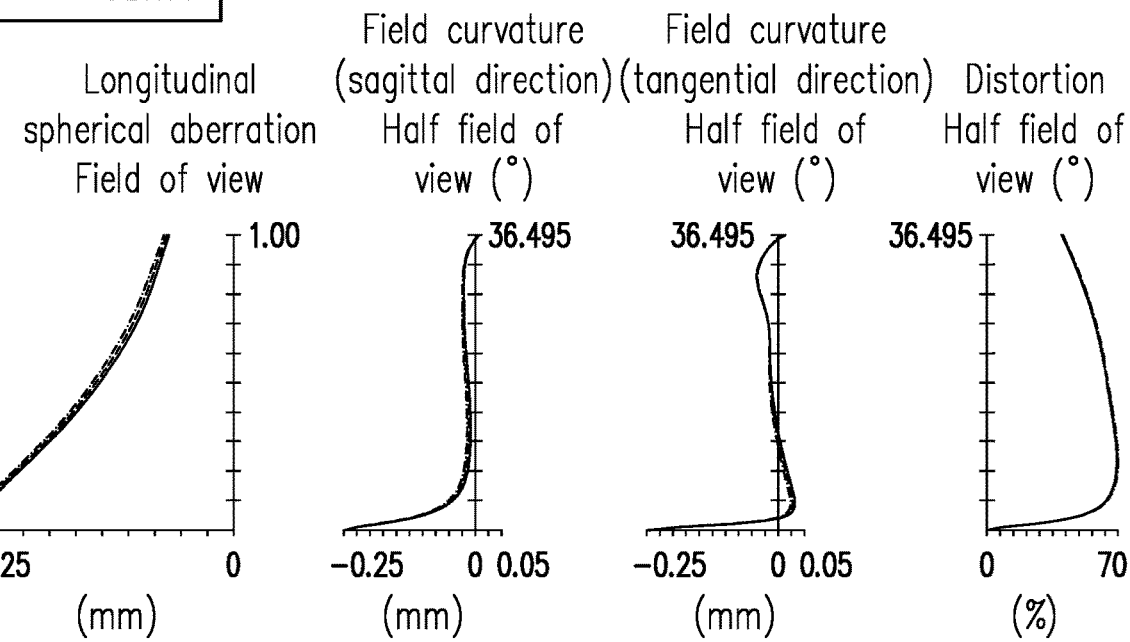
FIGS. 8A to 8D are views of the longitudinal spherical aberration and various aberrations of the optical lens assembly according to the first embodiment.

And referring to FIGS. 8A to 8D, FIG. 8A illustrates the longitudinal spherical aberration on the reference surface 100a according to the first embodiment when wavelengths are 520 nm, 530 nm, and 540 nm. FIG. 8B and FIG. 8C respectively illustrates a field curvature aberration in a sagittal direction and a field curvature aberration in a tangential direction on the reference surface 100a according to the first embodiment when the wavelengths are 520 nm, 530 nm, and 240 nm. FIG. 8D illustrates a distortion aberration on the reference surface 100a according to the first embodiment when the wavelengths are 520 nm, 530 nm and 540 nm. In the longitudinal spherical aberration view of the first embodiment in FIG. 8A, a curve formed by each wavelength is very close to other curves and approaches the middle, illustrating that off-axis rays at different heights of each wavelength are concentrated near an imaging point. It can be seen from deflection amplitude of the curve of each wavelength that a deviation of the imaging point of the off-axis rays at the different heights is controlled within a range of ±0.25 mm, therefore the embodiment does significantly improve the spherical aberration of the same wavelength. In addition, distances between the three representative wavelengths are also quite close to each other, representing that imaging positions of light of the different wavelengths are already quite concentrated, therefore allowing a significant improvement in chromatic aberration.

In the field curvature aberration views of FIG. 8B and FIG. 8C, an amount of the focal length variation of the three representative wavelengths in an entire field of view falls within a range of ±0.25 mm. This illustrates that the optical system according to the first embodiment can effectively eliminate aberration. The distortion aberration view of FIG. 8D shows that an amount of the distortion aberration of the first embodiment falls within a range of ±70%, indicating that the distortion aberration of the first embodiment has met the optical quality requirements of the optical system. Accordingly, it illustrates that compared with a conventional optical lens assembly, the first embodiment can still provide better optical quality under a condition of the system length being shortened to approximately 4.611 mm.

Figure 11:
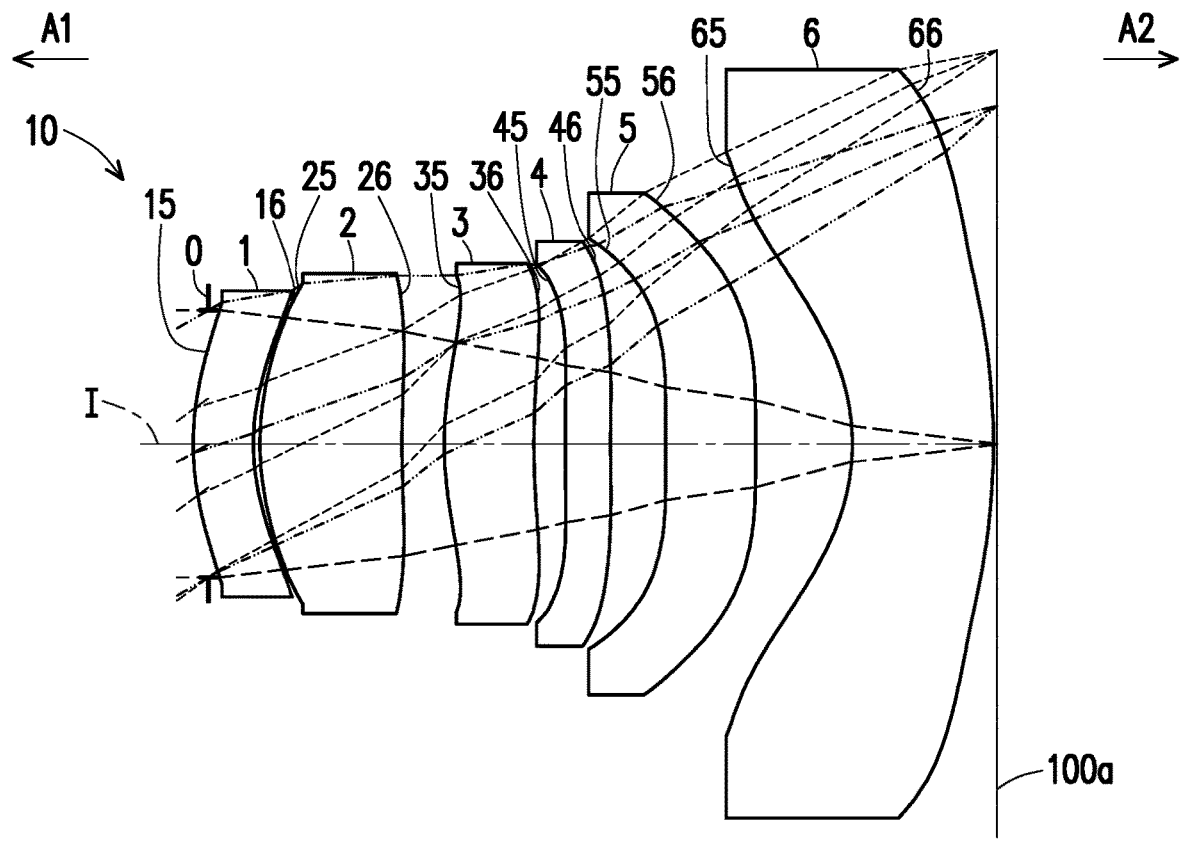
FIG. 11 is a schematic view of an optical lens assembly according to a second embodiment of the disclosure.

FIG. 11 is a schematic view of an optical lens assembly according to a second embodiment of the disclosure, and FIGS. 12A to 12D are views of the longitudinal spherical aberration and various aberrations of the optical lens assembly according to the second embodiment. Referring to FIG. 11 first, the second embodiment of the optical lens assembly 10 of the disclosure, which is roughly similar to the first embodiment, except for the optical data, the aspheric coefficients and the parameters of the lens elements 1, 2, 3, 4, 5, and 6 that are more or less different. In addition, in the embodiment, the material of the second lens element 2 is glass and the sixth lens element 6 has negative refracting power. It should be noted here that, in order to clearly show the drawing, a part of the reference numerals of the optical axis region and the periphery region similar to the first embodiment are omitted in FIG. 11.

The optical lens assembly 10 of the second embodiment has good thermal stability. Furthermore, under different ambient temperatures, the optical lens assembly 10 has a very small focal shift. For example, in an environment of 0° C., the focal shift of the optical lens assembly 10 is 0.006 mm; in an environment of 20° C., the focal shift of the optical lens assembly 10 is 0.000 mm; and in an environment of 70° C., the focal shift of the optical lens assembly 10 is −0.015 mm.

The detailed optical data of the optical lens assembly 10 according to the second embodiment is shown in FIG. 13. The effective focal length of the second embodiment is 4.193 mm, the half field of view is 36.500°, the system length is 5.123 mm, the f-number is 2.459, and the LCR (or image height ImgH) is 2.507 mm.

As shown in FIG. 14, the data is the aspheric coefficients of the second embodiment in the conditional expression (2).

In addition, relationships between the important parameters in the optical lens assembly 10 according to the second embodiment are shown in FIG. 43.

Figures 12A, 12B, 12C, 12D:
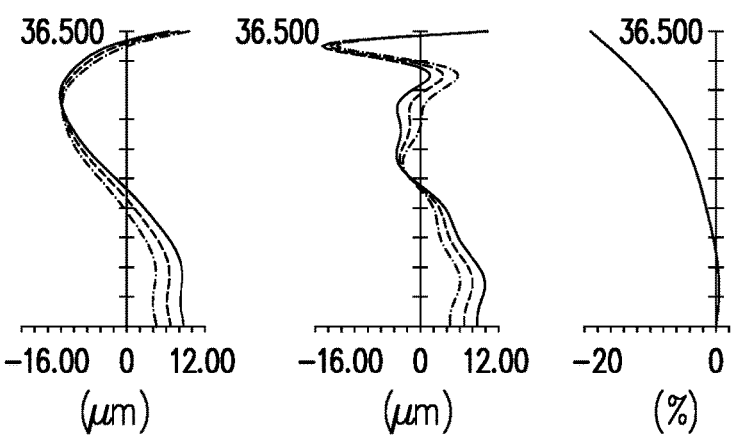
FIGS. 12A to 12D are views of the longitudinal spherical aberration and various aberrations of the optical lens assembly according to the second embodiment.

And referring to FIGS. 12A to 12D, FIG. 12A illustrates the longitudinal spherical aberration on the reference surface 100a according to the second embodiment when the wavelengths are 520 nm, 530 nm, and 540 nm. FIG. 12B and FIG. 12C respectively illustrates the field curvature aberration in the sagittal direction and the field curvature aberration in the tangential direction on the reference surface 100a according to the second embodiment when the wavelengths are 520 nm, 530 nm, and 540 nm. FIG. 12D illustrates the distortion aberration on the reference surface 100a according to the second embodiment when the wavelengths are 520 nm, 530 nm, and 540 nm. In the longitudinal spherical aberration view of the second embodiment in FIG. 12A, the deviation of the imaging point of the off-axis rays at the different heights is controlled within a range of ±0.009 mm. In the field curvature aberration views of FIG. 12B and FIG. 12C, the amount of the focal length variation of the three representative wavelengths in the entire field of view falls within a range of ±16 μm. The distortion aberration view of FIG. 12D shows that the distortion aberration of the second embodiment is maintained within a range of ±20%. Accordingly, it illustrates that compared with the conventional optical lens assembly, the second embodiment can still provide better optical quality under a condition of the system length being shortened to approximately 5.123 mm.

According to the above description, advantages of the second embodiment when compared with the first embodiment include the following. The half field of view of the second embodiment is greater than the half field of view of the first embodiment. The longitudinal spherical aberration of the second embodiment is less than the longitudinal spherical aberration of the first embodiment. The field curvature aberration of the second embodiment is less than the field curvature aberration of the first embodiment. The thermal stability of the second embodiment at 0° C. is better than the thermal stability of the first embodiment, and the thermal stability of the second embodiment at 70° C. is better than the thermal stability of the first embodiment.

Figure 15:
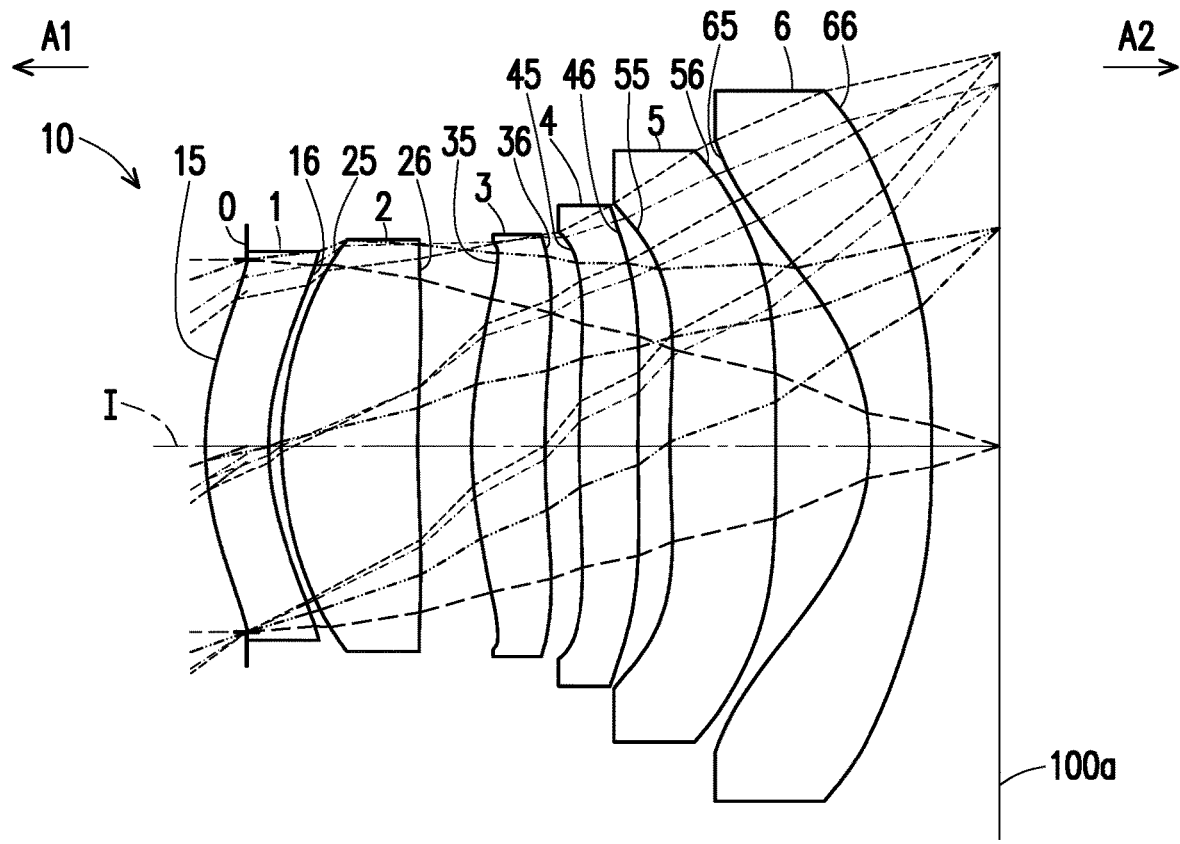
FIG. 15 is a schematic view of an optical lens assembly according to a third embodiment of the disclosure.

FIG. 15 is a schematic view of an optical lens assembly according to a third embodiment of the disclosure, and FIGS. 16A to 16D are views of the longitudinal spherical aberration and various aberrations of the optical lens assembly according to the third embodiment. Referring to FIG. 15 first, the third embodiment of the optical lens assembly 10 of the disclosure, which is roughly similar to the first embodiment, except for the optical data, the aspheric coefficients and the parameters of the lens elements 1, 2, 3, 4, 5, 6 that are more or less different. In addition, in the embodiment, the sixth lens element 6 has negative refracting power. It should be noted here that, in order to clearly show the drawing, a part of the reference numerals of the optical axis region and the periphery region similar to the first embodiment are omitted in FIG. 15.

The optical lens assembly 10 of the third embodiment has good thermal stability. Furthermore, under different ambient temperatures, the optical lens assembly 10 has a very small focal shift. For example, in an environment of 0° C., the focal shift of the optical lens assembly 10 is −0.0105 mm; in an environment of 20° C., the focal shift of the optical lens assembly 10 is 0.000 mm; and in an environment of 70° C., the focal shift of the optical lens assembly 10 is 0.0275 mm.

The detailed optical data of the optical lens assembly 10 according to the third embodiment is shown in FIG. 17. The effective focal length of the third embodiment is 3.354 mm, the half field of view is 36.500°, the system length is 4.263 mm, the f-number is 1.677, and the LCR (or image height ImgH) is 2.113 mm.

As shown in FIG. 18, the data is the aspheric coefficients of the third embodiment in the conditional expression (2).

In addition, relationships between the important parameters in the optical lens assembly 10 according to the third embodiment are shown in FIG. 43.

Figure 16A:
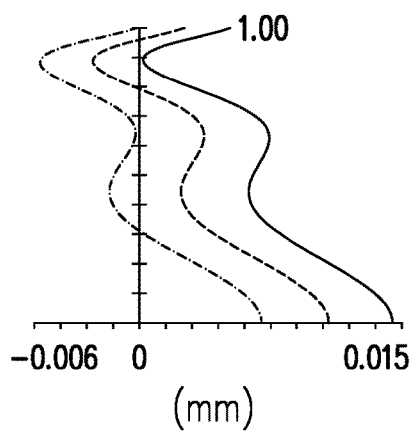
FIGS. 16A to 16D are views of the longitudinal spherical aberration and various aberrations of the optical lens assembly according to the third embodiment.
Figure 16B:
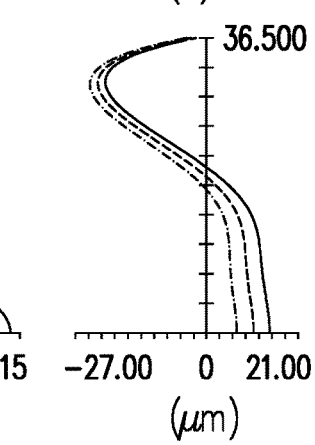
Figures 16C, 16D:
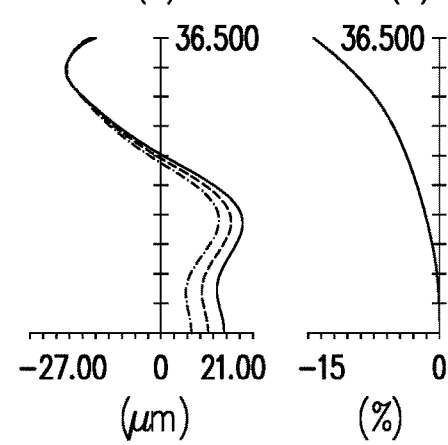

And referring to Figured 16A to 16D, FIG. 16A illustrates the longitudinal spherical aberration on the reference surface 100a according to the third embodiment when the wavelengths are 520 nm, 530 nm, and 540 nm. FIG. 16B and FIG. 16C respectively illustrate the field curvature aberration in the sagittal direction and the field curvature aberration in the tangential direction on the reference surface 100a according to the third embodiment when the wavelengths are 520 nm, 530 nm, and 540 nm. FIG. 16D illustrates the distortion aberration on the reference surface 100a according to the third embodiment when the wavelengths are 520 nm, 530 nm, and 540 nm. In the longitudinal spherical aberration view of the third embodiment in FIG. 16A, the deviation of the imaging point of the off-axis rays at the different heights falls within a range of ±0.015 mm. In the field curvature aberration views of FIG. 16B and FIG. 16C, the amount of the focal length variation of the three representative wavelengths in the entire field of view falls within a range of ±27 µm. The distortion aberration view of FIG. 16D shows that the distortion aberration of the third embodiment is maintained within a range of ±15%. Accordingly, it illustrates that compared with the conventional optical lens assembly, the third embodiment can still provide better optical quality under a condition of the system length being shortened to approximately 4.263 mm.

According to the above description, advantages of the third embodiment when compared with the first embodiment include the following. The system length of the third embodiment is less than the system length of the first embodiment. The half field of view of the third embodiment is greater than the half field of view of the first embodiment. The longitudinal spherical aberration of the third embodiment is less than the longitudinal spherical aberration of the first embodiment. The field curvature aberration of the third embodiment is less than the field curvature aberration of the first embodiment. The thermal stability of the third embodiment at 0° C. is better than the thermal stability of the first embodiment.

FIG. 19 is a schematic view of an optical lens assembly according to a fourth embodiment of the disclosure, and FIGS. 20A to 20D are views of the longitudinal spherical aberration and various aberrations of the optical lens assembly according to the fourth embodiment. Referring to FIG. 19 first, the fourth embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the periphery region 264 of the second side surface 26 of the second lens element 2 is concave, the periphery region 353 of the first side surface 35 of the third lens element 3 is convex, and the periphery region 364 of the second side surface 36 of the third lens element 3 is concave. The optical axis region 562 of the second side surface 56 of the fifth lens element 5 is concave. The sixth lens element 6 has negative refracting power. It should be noted here that, in order to clearly show the drawing, a part of the reference numerals of the optical axis region and the periphery region similar to the first embodiment are omitted in FIG. 19.

The optical lens assembly 10 of the fourth embodiment has good thermal stability. Furthermore, under different ambient temperatures, the optical lens assembly 10 has a very small focal shift. For example, in an environment of 0° C., the focal shift of the optical lens assembly 10 is −0.011 mm; in an environment of 20° C., the focal shift of the optical lens assembly 10 is 0.000 mm; and in an environment of 70° C., the focal shift of the optical lens assembly 10 is 0.029 mm.

The detailed optical data of the optical lens assembly 10 according to the fourth embodiment is shown in FIG. 21. The effective focal length of the fourth embodiment is 3.405 mm, the half field of view is 36.492°, the system length is 4.088 mm, the f-number is 1.703, and the LCR (or image height ImgH) is 2.140 mm.

As shown in FIG. 22, the data is the aspheric coefficients of the fourth embodiment in the conditional expression (2).

In addition, relationships between the important parameters in the optical lens assembly 10 of the fourth embodiment are shown in FIG. 43.

And referring to FIGS. 20A to 20D, FIG. 20A illustrates the longitudinal spherical aberration on the reference surface 100a according to the fourth embodiment when the wavelengths are 520 nm, 530 nm, and 540 nm. FIG. 20B and FIG. 20C respectively illustrate the field curvature aberration in the sagittal direction and the field curvature aberration in the tangential direction on the reference surface 100a according to the fourth embodiment when the wavelengths are 520 nm, 530 nm, and 540 nm. FIG. 20D illustrates the distortion aberration on the reference surface 100a according to the fourth embodiment when the wavelengths are 520 nm, 530 nm, and 540 nm. In the longitudinal spherical aberration view of the fourth embodiment in FIG. 20A, the deviation of the imaging point of the off-axis rays at different heights is controlled to fall within a range of ±0.023 mm. In the field curvature aberration views of FIG. 20B and FIG. 20C, the amount of the focal length variation of the three representative wavelengths in the entire field of view falls within a range of ±34 µm. The distortion aberration view of FIG. 20D shows that the distortion aberration of the fourth embodiment is maintained within a range of ±15%. Accordingly, it illustrates that compared with the conventional optical lens assembly, the fourth embodiment can still provide better optical quality under a condition of the system length being shortened to approximately 4.088 mm.

According to the above description, advantages of the fourth embodiment when compared with the first embodiment include the following. The system length of the fourth embodiment is less than the system length of the first embodiment. The longitudinal spherical aberration of the fourth embodiment is less than the longitudinal spherical aberration of the first embodiment. The field curvature aberration of the fourth embodiment is less than the field curvature aberration of the first embodiment.

FIG. 23 is a schematic view of an optical lens assembly according to a fifth embodiment of the disclosure, and FIGS. 24A to 24D are views of the longitudinal spherical aberration and various aberrations of the optical lens assembly according to the fifth embodiment. Referring to FIG. 23 first, the fifth embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the optical axis region 562 of the second side surface 56 of the fifth lens element 5 is concave. The sixth lens element 6 has negative refracting power. It should be noted here that, in order to clearly show the drawing, a part of the reference numerals of the optical axis region and the periphery region similar to the first embodiment are omitted in FIG. 23.

The optical lens assembly 10 of the fifth embodiment has good thermal stability. Furthermore, under different ambient temperatures, the optical lens assembly 10 has a very small focal shift. For example, in an environment of 0° C., the focal shift of the optical lens assembly 10 is −0.011 mm; in an environment of 20° C., the focal shift of the optical lens assembly 10 is 0.000 mm; and in an environment of 70° C., the focal shift of the optical lens assembly 10 is 0.029 mm.

The detailed optical data of the optical lens assembly 10 according to the fifth embodiment is shown in FIG. 25. The effective focal length of the fifth embodiment is 3.507 mm, the half field of view is 36.500°, the system length is 4.323 mm, the f-number is 1.754, and the LCR (or image height ImgH) It is 2.233 mm.

As shown in FIG. 26, the data is the aspheric coefficients of the fifth embodiment in the conditional expression (2).

In addition, relationships between the important parameters in the optical lens assembly 10 of the fifth embodiment are shown in FIG. 43.

And referring to FIGS. 24A to 24D, FIG. 24A illustrates the longitudinal spherical aberration on the reference surface 100a according to the fifth embodiment when the wavelengths are 520 nm, 530 nm and 540 nm. FIG. 24B and FIG. 24C respectively illustrate the field curvature aberration in the sagittal direction and the field curvature aberration in the tangential direction on the reference surface 100a according to the fifth embodiment when the wavelengths are 520 nm, 530 nm, and 540 nm. FIG. 24D illustrates the distortion aberration on the reference surface 100a according to the fifth embodiment when the wavelengths are 520 nm, 530 nm, and 540 nm. In the longitudinal spherical aberration view of the fifth embodiment in FIG. 24A, the deviation of the imaging point of the off-axis rays at the different heights falls within a range of ±0.016 mm. In the field curvature aberration views of FIG. 24B and FIG. 24C, the amount of the focal length variation of the three representative wavelengths in the entire field of view falls within a range of ±30 μm. The distortion aberration view of FIG. 24D shows that the distortion aberration of the fifth embodiment is maintained within a range of ±14%. Accordingly, it illustrates that compared with the conventional optical lens assembly, the fifth embodiment can still provide better imaging quality under a condition of the system length being shortened to approximately 4.323 mm.

According to the above description, advantages of the fifth embodiment when compared with the first embodiment include the following. The system length of the fifth embodiment is less than the system length of the first embodiment. The half field of view of the fifth embodiment is greater than the half field of view of the first embodiment. The longitudinal spherical aberration of the fifth embodiment is less than the longitudinal spherical aberration of the first embodiment. The field curvature aberration of the fifth embodiment is less than the field curvature aberration of the first embodiment.

Figure 27:
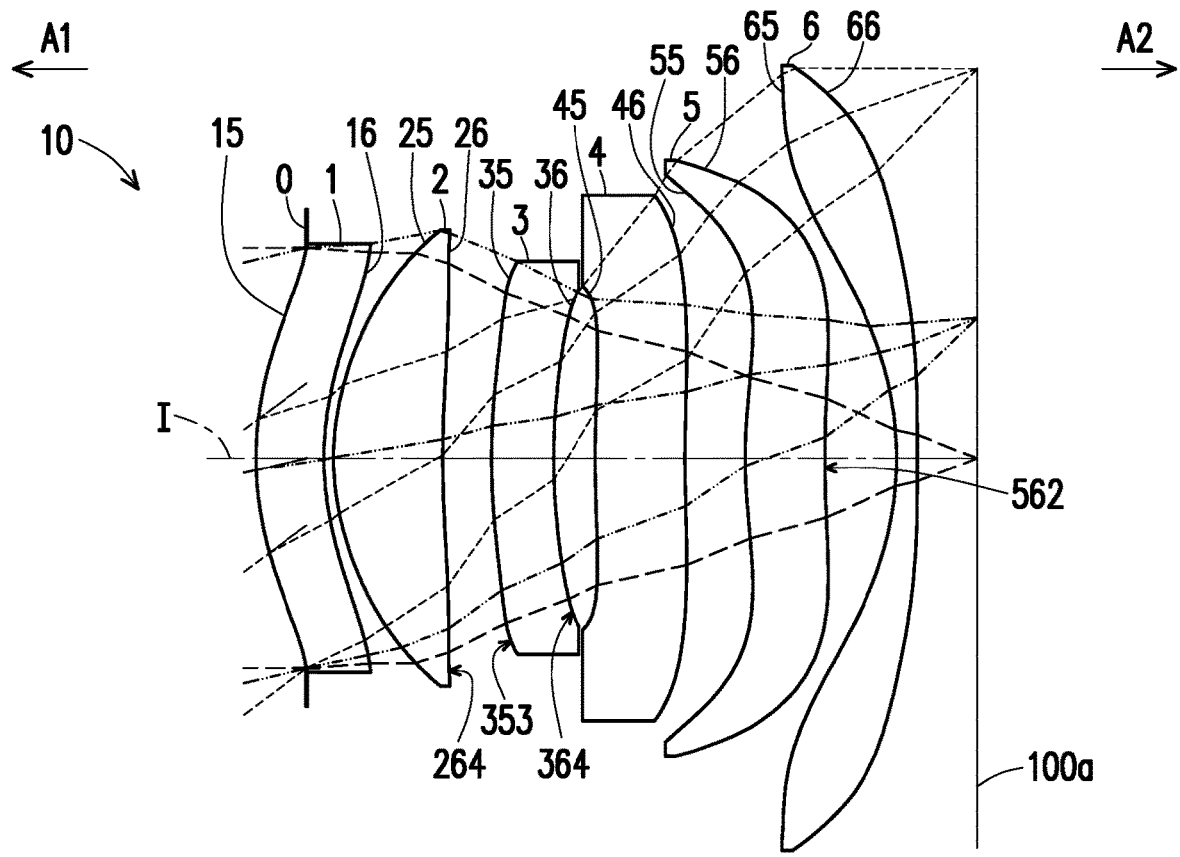
FIG. 27 is a schematic view of an optical lens assembly according to a sixth embodiment of the disclosure.

FIG. 27 is a schematic view of the optical lens assembly according to a sixth embodiment of the disclosure, and FIGS. 28A to 28D are views of the longitudinal spherical aberration and various aberrations of the optical lens assembly according to the sixth embodiment. Referring to FIG. 27 first, the sixth embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the periphery region 264 of the second side surface 26 of the second lens element 2 is concave. The third lens element 3 has negative refracting power. The periphery region 353 of the first side surface 35 of the third lens element 3 is convex, and the periphery region 364 of the second side surface 36 of the third lens element 3 is concave. The optical axis region 562 of the second side surface 56 of the fifth lens element 5 is concave. The sixth lens element 6 has negative refracting power. It should be noted here that, in order to clearly show the drawing, a part of the reference numerals of the optical axis region and the periphery region similar to the first embodiment are omitted in FIG. 27.

The optical lens assembly 10 of the sixth embodiment has good thermal stability. Furthermore, under different ambient temperatures, the optical lens assembly 10 has a very small focal shift. For example, in an environment of 0° C., the focal shift of the optical lens assembly 10 is −0.01 mm; in an environment of 20° C., the focal shift of the optical lens assembly 10 is 0.000 mm; and in an environment of 70° C., the focal shift of the optical lens assembly 10 is 0.025 mm.

The detailed optical data of the optical lens assembly 10 according to the sixth embodiment is shown in FIG. 29. The effective focal length of the sixth embodiment is 2.905 mm, the half field of view is 36.500°, the system length is 3.430 mm, the f-number is 1.453, and the LCR (or image height ImgH) is 1.843 mm.

As shown in FIG. 30, the data is the aspheric coefficients of the sixth embodiment in the conditional expression (2).

In addition, relationships between the important parameters in the optical lens assembly 10 of the sixth embodiment are shown in FIG. 44.

Figure 28A:
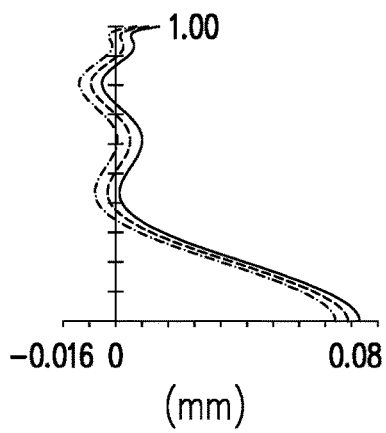
FIGS. 28A to 28D are views of the longitudinal spherical aberration and various aberrations of the optical lens assembly according to the sixth embodiment.
Figure 28B:
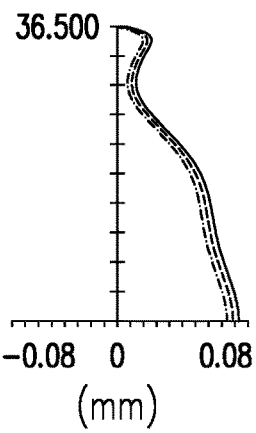
Figure 28C:
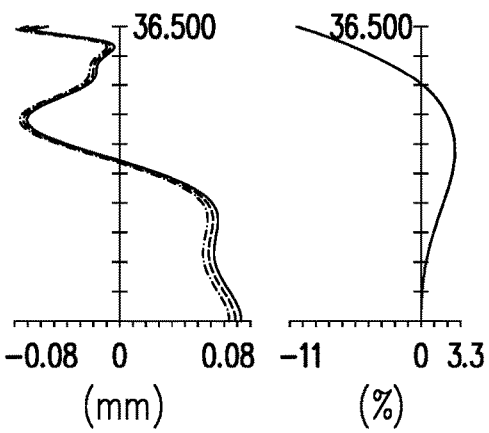
Figure 28D:
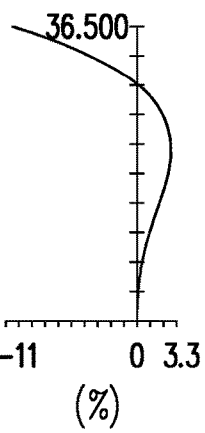

And referring to FIGS. 28A to 28D, FIG. 28A illustrates the longitudinal spherical aberration on the reference surface 100a according to the sixth embodiment when the wavelengths are 520 nm, 530 nm and 540 nm. FIG. 28B and FIG. 28C respectively illustrate the field curvature aberration in the sagittal direction and the field curvature aberration in the tangential direction on the reference surface 100a according to the sixth embodiment when the wavelengths are 520 nm, 530 nm, and 540 nm. FIG. 28D illustrates the distortion aberration on the reference surface 100a according to the sixth embodiment when the wavelengths are 520 nm, 530 nm, and 540 nm. In the longitudinal spherical aberration view of the sixth embodiment in FIG. 28A, the deviation of the imaging point of the off-axis rays at the different heights falls within a range of ±0.08 mm. In the field curvature aberration views of FIG. 28B and FIG. 28C, the amount of the focal length variation of the three representative wavelengths in the entire field of view falls within a range of ±0.08 mm. The distortion aberration view of FIG. 28D shows that the distortion aberration of the sixth embodiment is maintained within a range of ±11%. Accordingly, it illustrates that compared with the conventional optical lens assembly, the sixth embodiment can still provide better optical quality under a condition of the system length being shortened to approximately 3.430 mm.

According to the above description, advantages of the sixth embodiment when compared with the first embodiment include the following. The system length of the sixth embodiment is less than the system length of the first embodiment. The half field of view of the sixth embodiment is greater than the half field of view of the first embodiment. The f-number of the sixth embodiment is less than the f-number of the first embodiment. The longitudinal spherical aberration of the sixth embodiment is less than the longitudinal spherical aberration of the first embodiment. The field curvature aberration of the sixth embodiment is less than the field curvature aberration of the first embodiment. The thermal stability of the sixth embodiment at 0° C. is better than the thermal stability of the first embodiment, and the thermal stability of the sixth embodiment at 70° C. is better than the thermal stability of the first embodiment.

Figure 31:
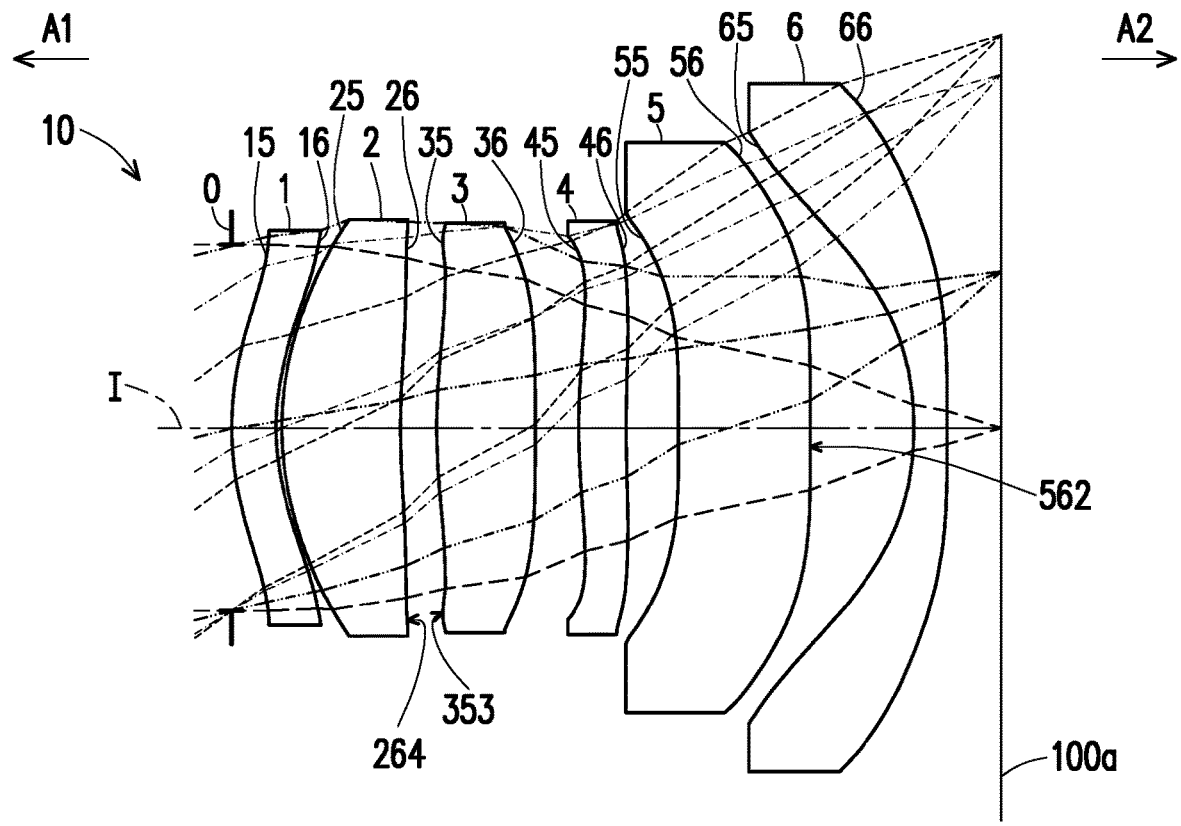
FIG. 31 is a schematic view of an optical lens assembly according to a seventh embodiment of the disclosure.

FIG. 31 is a schematic view of an optical lens assembly according to a seventh embodiment of the disclosure, and FIGS. 32A to 32D are views of the longitudinal spherical aberration and various aberrations of the optical lens assembly according to the seventh embodiment. Referring to FIG. 31 first, the seventh embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the material of the second lens element 2 is glass. The periphery region 264 of the second side surface 26 of the second lens element 2 is concave. The periphery region 353 of the first side surface 35 of the third lens element 3 is convex. The fifth lens element 5 has negative refracting power. The optical axis region 562 of the second side surface 56 of the fifth lens element 5 is concave. It should be noted here that, in order to clearly show the drawing, a part of the reference numerals of the optical axis region and the periphery region similar to the first embodiment are omitted in FIG. 31.

The optical lens assembly 10 of the seventh embodiment has good thermal stability. Furthermore, under different ambient temperatures, the optical lens assembly 10 has a very small focal shift. For example, in an environment of 0° C., the focal shift of the optical lens assembly 10 is 0.0035 mm; in an environment of 20° C., the focal shift of the optical lens assembly 10 is 0.000 mm; and in an environment of 70° C., the focal shift of the optical lens assembly 10 is −0.009 mm.

The detailed optical data of the optical lens assembly 10 according to the seventh embodiment is shown in FIG. 33. The effective focal length of the seventh embodiment is 2.854 mm, the half field of view is 36.479°, the system length is 4.197 mm, the f-number is 1.427, and the LCR (or image height ImgH) is 2.140 mm.

As shown in FIG. 34, the data is the aspheric coefficients of the seventh embodiment in the conditional expression (2).

In addition, relationships between the important parameters in the optical lens assembly 10 of the seventh embodiment are shown in FIG. 44.

Figures 32A, 32B, 32C, 32D:
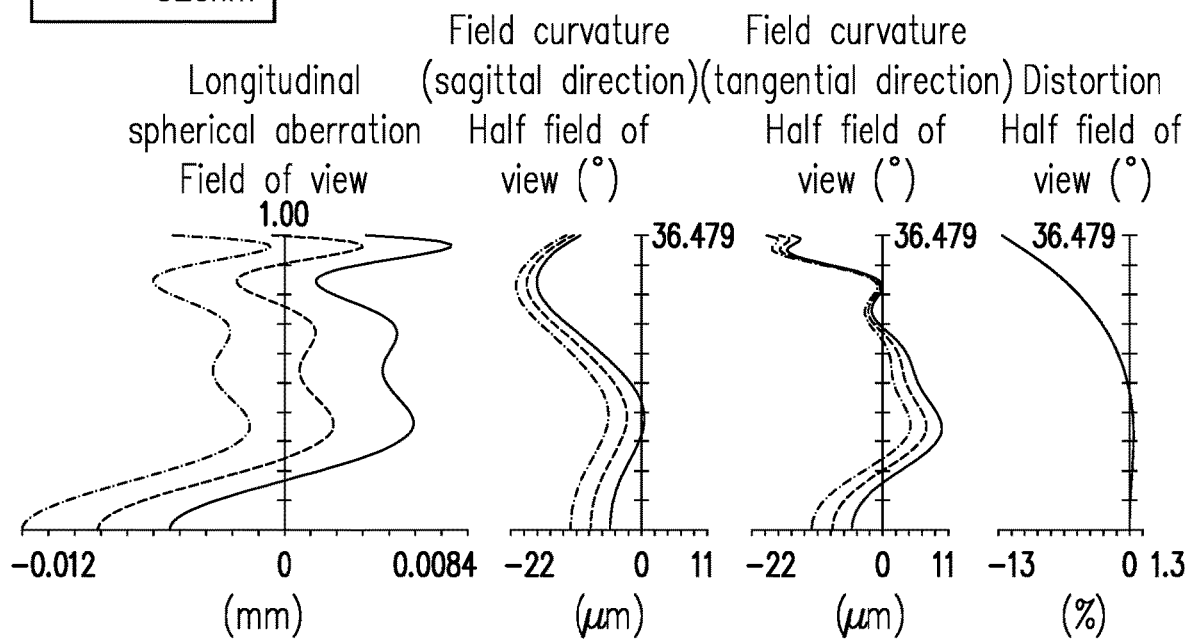
FIGS. 32A to 32D are views of the longitudinal spherical aberration and various aberrations of the optical lens assembly according to the seventh embodiment.

And referring to FIGS. 32A to 32D, FIG. 32A illustrates the longitudinal spherical aberration on the reference surface 100a according to the seventh embodiment when the wavelengths are 520 nm, 530 nm, and 540 nm. FIG. 32B and FIG. 32C respectively illustrate the field curvature aberration in the sagittal direction and the field curvature aberration in the tangential direction on the reference surface 100a according to the seventh embodiment when the wavelengths are 520 nm, 530 nm, and 540 nm. FIG. 32D illustrates the distortion aberration on the reference surface 100a according to the seventh embodiment when the wavelengths are 520 nm, 530 nm, and 540 nm. In the longitudinal spherical aberration view of the seventh embodiment in FIG. 32A, the deviation of the imaging point of the off-axis rays at the different heights falls within a range of ±0.012 mm. In the field curvature aberration views of FIG. 32B and FIG. 32C, the amount of the focal length variation of the three representative wavelengths in the entire field of view falls within a range of ±22 μm. The distortion aberration view of FIG. 32D shows that the distortion aberration of the seventh embodiment is maintained within a range of ±13%. Accordingly, it illustrates that compared with the conventional optical lens assembly, the seventh embodiment can still provide better optical quality under a condition of the system length being shortened to approximately 4.197 mm.

According to the above description, advantages of the seventh embodiment when compared with the first embodiment include the following. The system length of the seventh embodiment is less than the system length of the first embodiment. The f-number of the seventh embodiment is less than the f-number of the first embodiment. The longitudinal spherical aberration of the seventh embodiment is less than the longitudinal spherical aberration of the first embodiment. The field curvature aberration of the seventh embodiment is less than the field curvature aberration of the first embodiment. The thermal stability of the seventh embodiment at 0° C. is better than the thermal stability of the first embodiment, and the thermal stability of the seventh embodiment at 70° C. is better than the thermal stability of the first embodiment.

Figure 35:
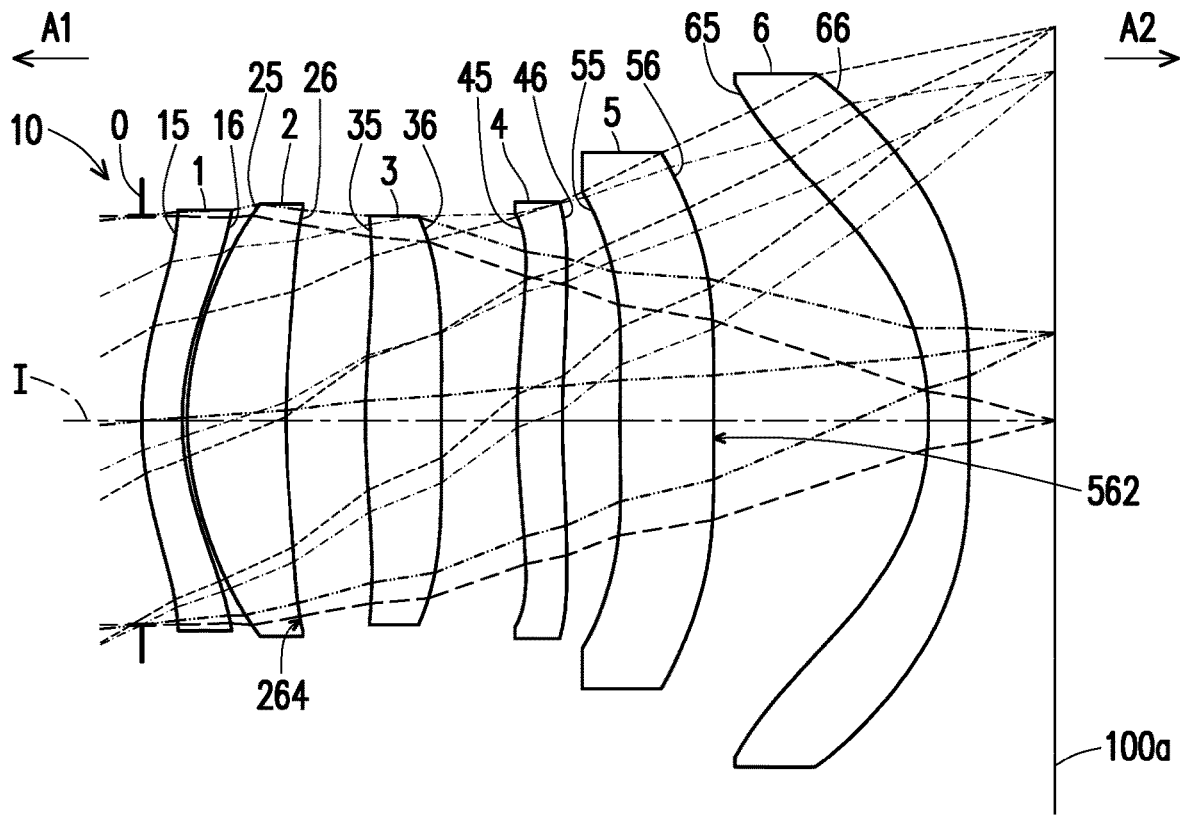
FIG. 35 is a schematic view of an optical lens assembly according to an eighth embodiment of the disclosure.

FIG. 35 is a schematic view of an optical lens assembly according to an eighth embodiment of the disclosure, and FIGS. 36A to 36D are views of the longitudinal spherical aberration and various aberrations of the optical lens assembly according to the eighth embodiment. Referring to FIG. 35 first, the eighth embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the material of the second lens element 2 is glass. The periphery region 264 of the second side surface 26 of the second lens element 2 is concave. The optical axis region 562 of the second side surface 56 of the fifth lens element 5 is concave. The sixth lens element 6 has negative refracting power. It should be noted here that, in order to clearly show the drawing, a part of the reference numerals of the optical axis region and the periphery region similar to the first embodiment are omitted in FIG. 35.

The optical lens assembly 10 of the eighth embodiment has good thermal stability. Furthermore, under different ambient temperatures, the optical lens assembly 10 has a very small focal shift. For example, in an environment of 0° C., the focal shift of the optical lens assembly 10 is 0.0035 mm; in an environment of 20° C., the focal shift of the optical lens assembly 10 is 0.000 mm; and in an environment of 70° C., the focal shift of the optical lens assembly 10 is −0.009 mm.

The detailed optical data of the optical lens assembly 10 according to the eighth embodiment is shown in FIG. 37. The effective focal length of the eighth embodiment is 4.024 mm, the half field of view is 30.348°, the system length is 4.468 mm, the f-number is 2.012, and the LCR (or image height ImgH) is 1.926 mm.

As shown in FIG. 38, the data is the aspheric coefficients of the eighth embodiment in the conditional expression (2).

In addition, relationships between the important parameters in the optical lens assembly 10 of the eighth embodiment are shown in FIG. 44.

Figures 36A, 36B, 36C, 36D:
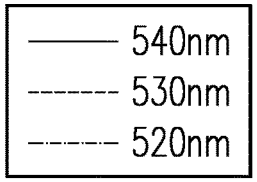
FIGS. 36A to 36D are views of the longitudinal spherical aberration and various aberrations of the optical lens assembly according to the eighth embodiment.

And referring to FIGS. 36A to 36D, FIG. 36A illustrates the longitudinal spherical aberration on the reference surface 100a according to the eighth embodiment when the wavelengths are 520 nm, 530 nm, and 540 nm. FIG. 36B and FIG. 36C respectively illustrate the field curvature aberration in the sagittal direction and the field curvature aberration in the tangential direction on the reference surface 100a according to the eighth embodiment when the wavelengths are 520 nm, 530 nm, and 540 nm. FIG. 36D illustrates the distortion aberration on the reference surface 100a according to the eighth embodiment when the wavelengths are 520 nm, 530 nm, and 540 nm. In the longitudinal spherical aberration view of the eighth embodiment in FIG. 36A, the deviation of the imaging point of the off-axis rays at the different heights falls within a range of ±0.045 mm. In the field curvature aberration views of FIG. 36B and FIG. 36C, the amount of the focal length variation of the three representative wavelengths in the entire field of view fall within a range of ±45 μm. The distortion aberration view of FIG. 36D shows that the distortion aberration of the eighth embodiment is maintained within a range of ±17%. Accordingly, it illustrates that compared with the conventional optical lens assembly, the eighth embodiment can still provide better imaging quality under a condition of the system length being shortened to approximately 4.468 mm.

According to the above description, advantages of the eighth embodiment when compared with the first embodiment include the following. The system length of the eighth embodiment is less than the system length of the first embodiment. The longitudinal spherical aberration of the eighth embodiment is less than the longitudinal spherical aberration of the first embodiment. The field curvature aberration of the eighth embodiment is less than the field curvature aberration of the first embodiment. The thermal stability of the eighth embodiment at 0° C. is better than the thermal stability of the first embodiment, and the thermal stability of the eighth embodiment at 70° C. is better than the thermal stability of the first embodiment.

Figure 39:
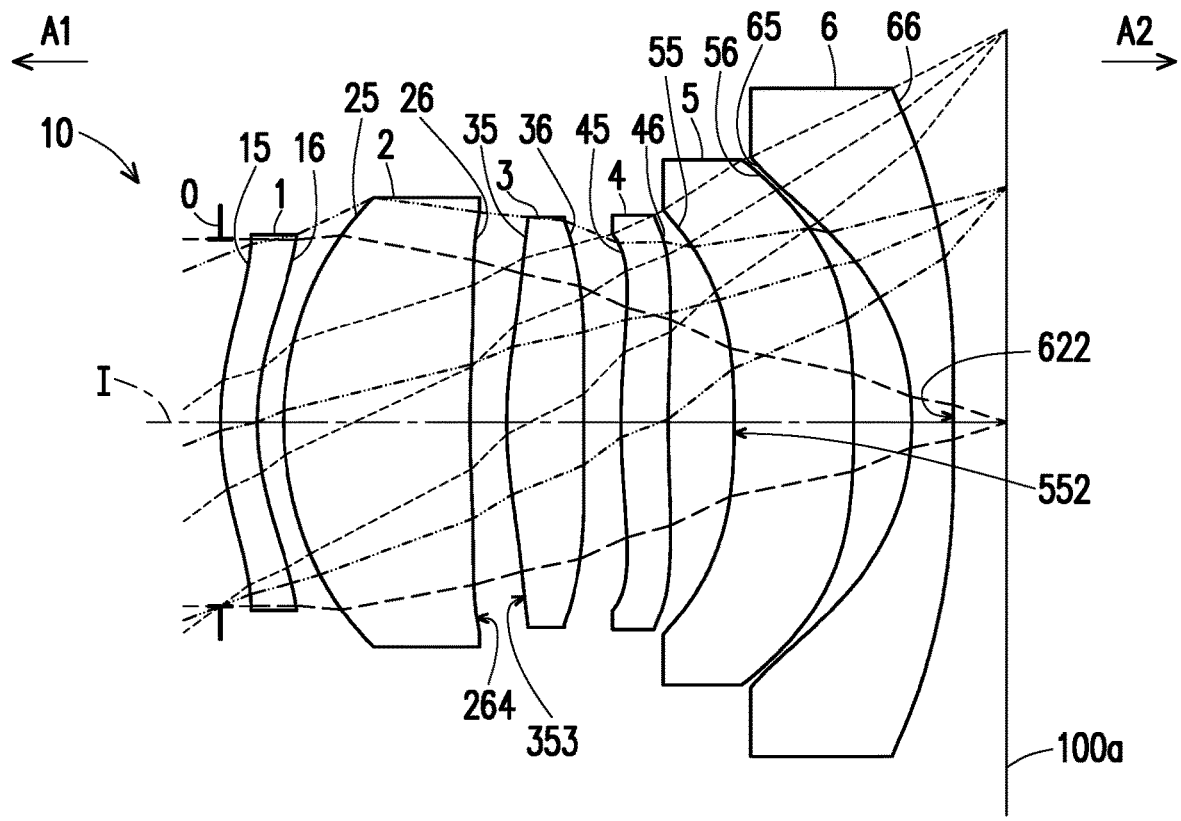
FIG. 39 is a schematic view of an optical lens assembly according to a ninth embodiment of the disclosure.

FIG. 39 is a schematic view of an optical lens assembly according to a ninth embodiment of the disclosure, and FIGS. 40A to 40D are views of the longitudinal spherical aberration and various aberrations of the optical lens assembly according to the ninth embodiment. Referring to FIG. 39 first, the ninth embodiment of the optical lens assembly 10 of the disclosure is roughly similar to the first embodiment, except for the optical data, the aspheric coefficients and the parameters of the lens elements 1, 2, 3, 4, 5, 6 that are more or less different. In addition, in the embodiment, the material of the second lens element 2 is glass. The periphery region 264 of the second side surface 26 of the second lens element 2 is concave. The periphery region 353 of the first side surface 35 of the third lens element 3 is convex. The fifth lens element 5 has negative refracting power. The optical axis region 552 of the first side surface 55 of the fifth lens element 5 is concave. The sixth lens element 6 has negative refracting power. The optical axis region 622 of the second side surface 62 of the sixth lens element 6 is concave. It should be noted here that, in order to clearly show the drawing, a part of the reference numerals of the optical axis region and the periphery region similar to the first embodiment are omitted in FIG. 39.

The optical lens assembly 10 of the ninth embodiment has good thermal stability. Furthermore, under different ambient temperatures, the optical lens assembly 10 has a very small focal shift. For example, in an environment of 0° C., the focal shift of the optical lens assembly 10 is 0.005 mm; in an environment of 20° C., the focal shift of the optical lens assembly 10 is 0.000 mm; and in an environment of 70° C., the focal shift of the optical lens assembly 10 is −0.012 mm.

The detailed optical data of the optical lens assembly 10 according to the ninth embodiment is shown in FIG. 41, and the effective focal length of the ninth embodiment is 3.418 mm, the half field of view is 36.307°, the system length is 4.281 mm, the f-number is 1.709, LCR (or image height ImgH) is 2.140 mm.

As shown in FIG. 42, the data is the aspheric coefficients of the ninth embodiment in the conditional expression (2).

In addition, relationships between the important parameters in the optical lens assembly 10 of the ninth embodiment are shown in FIG. 44.

Figures 40A, 40B, 40C, 40D:
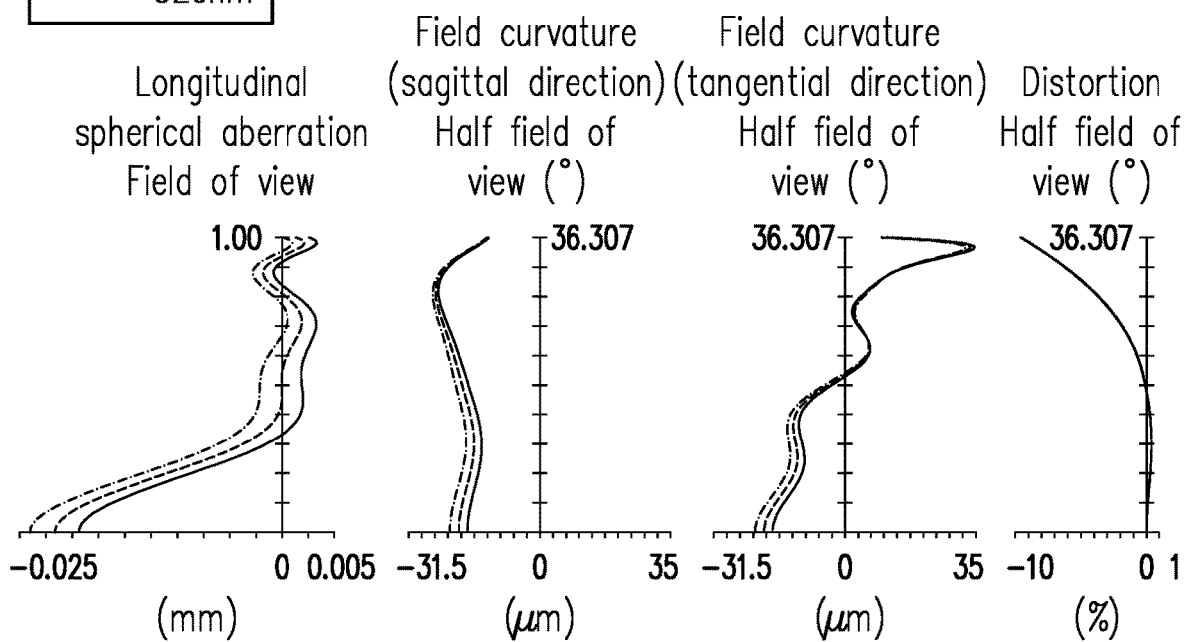
FIGS. 40A to 40D are views of the longitudinal spherical aberration and various aberrations of the optical lens assembly according to the ninth embodiment.

And referring to FIGS. 40A to 40D, FIG. 40A illustrates the longitudinal spherical aberration on the reference surface 100a according to the ninth embodiment when the wavelengths are 520 nm, 530 nm, and 540 nm. FIG. 40B and FIG. 40C respectively illustrate the field curvature aberration in the sagittal direction and the field curvature aberration in the tangential direction on the reference surface 100a according to the ninth embodiment when the wavelengths are 520 nm, 530 nm, and 540 nm. FIG. 40D illustrates the distortion aberration on the reference surface 100a according to the ninth embodiment when the wavelengths are 520 nm, 530 nm, and 540 nm. In the longitudinal spherical aberration view of the ninth embodiment in FIG. 40A, the deviation of the imaging point of the off-axis rays at the different heights falls within a range of ±0.025 mm. In the field curvature aberration views of FIG. 40B and FIG. 40C, the amount of the focal length variation of the three representative wavelengths in the entire field of view fall within a range of ±35 μm. The distortion aberration view of FIG. 40D shows that the distortion aberration of the ninth embodiment is maintained within a range of ±10%. Accordingly, it illustrates that compared with the conventional optical lens assembly, the ninth embodiment can still provide better optical quality under a condition of the system length being shortened to approximately 4.281 mm.

According to the above description, advantages of the ninth embodiment when compared to the first embodiment include the following. The longitudinal spherical aberration of the ninth embodiment is less than the longitudinal spherical aberration of the first embodiment. The field curvature aberration of the ninth embodiment is less than the field curvature aberration of the first embodiment. The thermal stability of the ninth embodiment at 0° C. is better than the thermal stability of the first embodiment, and the thermal stability of the ninth embodiment at 70° C. is better than the thermal stability of the first embodiment.

And referring to FIGS. 43 and 44, which are tabular views of the various optical parameters of the above nine embodiments. When the relationships between the various optical parameters in the optical lens assembly 10 according to the embodiment of the disclosure conform to at least one of the following conditional expressions, it can assist the designer to design an optical lens assembly that has good optical performance and is technically feasible.

The optical lens assembly 10 according to the embodiment of the disclosure further satisfies the following conditional expressions, which helps to maintain the effective focal length and the various optical parameters at an appropriate value, and prevents any parameter from being too large to be conducive to the correction of the overall aberration of the optical lens assembly 10, or prevent any parameter from being too small and affect assembling or increase the difficulty of manufacturing. Firstly, the optical lens assembly 10 further satisfies a conditional expression of TTL/EFL≤1.900, in which a preferable range is a conditional expression of 1.000≤TTL/EFL≤1.900. In addition, the optical lens assembly 10 further satisfies a conditional expression of TL*Fno/EFL≤3.000, in which a preferable range is a conditional expression of 1.350≤TL*Fno/EFL≤3.000.

The optical lens assembly 10 according to the embodiment of the disclosure further satisfies the following conditional expressions, which helps to maintain the thickness and interval of each lens element at an appropriate value, and prevents any parameter from being too large to be conducive to the overall thinning of the optical lens assembly, or prevent any parameter from being too small and affect assembling or increase the difficulty of manufacturing, which include:

the optical lens assembly 10 further satisfying a conditional expression of TTL*Fno/D22t62≤3.400, in which a preferable range is a conditional expression of 2.000≤TTL*Fno/D22t62≤3.400;

the optical lens assembly 10 further satisfying a conditional expression of $1.500 \leq T2/T_{avg}$, in which a preferable range is a conditional expression of $1.500 \leq T2/T_{avg} \leq 2.200$;

the optical lens assembly 10 further satisfying a conditional expression of $TTL/AAG \leq 3.500$, in which a preferable range is a conditional expression of $1.800 \leq TTL/AAG \leq 3.500$;

the optical lens assembly 10 further satisfying a conditional expression of $TL/(G23+G34+G45+G56) \leq 3.700$, in which a preferred range is a conditional expression of $1.700 \leq TL/(G23+G34+G45+G56) \leq 3.700$;

the optical lens assembly 10 further satisfying a conditional expression of $ALT/(T1+T2) \leq 3.000$, in which preferable range is a conditional expression of $1.900 \leq ALT/(T1+T2) \leq 3.000$;

the optical lens assembly 10 further satisfying a conditional expression of $D11t32/(G34+G56) \leq 3.800$, in which a preferable range is a conditional expression of $1.000 \leq D11t32/(G34+G56) \leq 3.800$;

the optical lens assembly 10 further satisfying a conditional expression of $ALT36/(G45+G56) \leq 2.500$, in which a preferable range is a conditional expression of $0.900 \leq ALT36/(G45+G56) \leq 2.500$;

the optical lens assembly 10 further satisfying a conditional expression of $D11t32/(G34+G45) \leq 5.100$, in which a preferable range is a conditional expression of $1.900 \leq D11t32/(G34+G45) \leq 5.100$;

the optical lens assembly 10 further satisfying a conditional expression of $(ALT+BFL)/D31t51 \leq 3.100$, in which a preferable range is a conditional expression of $1.600 \leq (ALT BFL)/D31t51 \leq 3.100$;

the optical lens assembly 10 further satisfying a conditional expression of $(T_{max}+T_{min})/G34 \leq 6.000$, in which a preferable range is a conditional expression of $1.600 \leq (T_{max}+T_{min})/G34 \leq 6.000$;

the optical lens assembly 10 further satisfying a conditional expression of $ALT46/T3 \leq 3.100$, in which a preferable range is a conditional expression of $1.200 \leq ALT46/T3 \leq 3.100$;

the optical lens assembly 10 further satisfying a conditional expression of $(T1+G12+T2)/G23 \leq 6.800$, in which a preferable range is a conditional expression of $1.600 \leq (T1+G12+T2)/G23 \leq 6.800$;

the optical lens assembly 10 further satisfying a conditional expression of $ALT/(T2+T3) \leq 2.600$, in which a preferable range is a conditional expression of $1.700 \leq ALT/(T2+T3) \leq 2.600$;

the optical lens assembly 10 further satisfying a conditional expression of $TTL/D31t51 \leq 4.000$, in which a preferable range is a conditional expression of $2.500 \leq TTL/D31t51 \leq 4.000$;

the optical lens assembly 10 further satisfying a conditional expression of $(D11t22+BFL)/T_{max} \leq 2.800$, in which a preferable range is $1.300 \leq (D11t22+BFL)/T_{max} \leq 2.800$.

In view of the unpredictability of the optical system design, under the framework of the disclosure, conforming to the above conditional expressions can preferably enable the system length of the disclosure to be shortened, increase the available aperture, improve the optical quality, or increase the assembly yield rate.

The exemplary limiting relational conditional expressions listed above can also be selectively combined arbitrarily in unequal numbers to be used in the embodiments of the disclosure, and are not limited thereto. In the implementation of the disclosure, in addition to the above relational conditional expressions, it is also possible to design other additional detailed structures such as arrangement of concave and convex surfaces of the lens elements according to a single lens element or the multiple lens elements, so as to strengthen the control of system performance and/or resolution. It should be noted that these details need to be in no conflict with each other, before being selectively combined and applied to other embodiments of the disclosure.

The numerical range including the maximum and minimum values obtained from the combination ratio relationship of the optical parameters disclosed in each embodiment of the disclosure can be implemented accordingly.

In summary, the optical lens assembly 10 according to the embodiments of the disclosure has at least one of the following effects and advantages.

Firstly, the longitudinal spherical aberration, the field curvature aberration, and the distortion of each embodiment of the disclosure conform to the usage specifications. In addition, the three off-axis rays with the representative wavelengths of 520 nm, 530 nm, and 540 nm at the different heights are concentrated near the imaging point. It can be seen from the deflection amplitude of each curve that the deviation of the imaging point of the off-axis rays at the different heights is controlled and has good spherical aberration, aberration and distortion suppression abilities. With further reference to the imaging quality data, distances between the three representative wavelengths of 520 nm, 530 nm, and 540 nm are also quite close to each other, which shows that the disclosure has good concentration of light of different wavelengths under various conditions and has excellent dispersion suppression ability. In summary, the disclosure can generate excellent imaging quality through the design and mutual collocation of the lens elements.

Secondly, in the optical lens assembly 10 according to the embodiment of the disclosure, the aperture 0 is disposed in front of the first lens element 1, the first lens element 1 has negative refracting power, and satisfies an conditional expression of $EFL*Fno/D11t22 \leq 11.500$, and in collocation with the following surface shape and refracting power combinations a to c:

a. The optical axis region 462 of the second side surface 46 of the fourth lens element 4 is concave.

b. The optical axis region 151 of the first side surface 15 of the first lens element 1 is convex, the second lens element 2 has positive refracting power, and the optical axis region 451 of the first side surface 45 of the fourth lens element 4 is convex.

c. The second lens element 2 has positive refracting power, the optical axis region 451 of the first side surface 45 of the fourth lens element 4 is convex, and the periphery region of the second side surface of the sixth lens is convex.

Such a design is conducive to providing an optical lens assembly with a small size, a large aperture, high thermal stability, and can be simultaneously applied to light sources of different wavebands. A preferred restriction of the above conditional expression is $EFL*Fno/D11t22 \leq 8.100$, and an optimal restriction is $4.300 \leq EFL*Fno/D11t22 \leq 8.100$.

Thirdly, in the optical lens assembly 10 according to the embodiment of the disclosure, the aperture 0 of the optical lens assembly 10 is disposed in front of the first lens element 1, the first lens element 1 has negative refracting power, and satisfies the conditional expression of $EFL*Fno/D11t22 \leq 8.100$, and in collocation with the following surface shape and refracting power combinations:

d. The optical axis region 562 of the second side surface 56 of the fifth lens element 5 is concave.

e. The second lens element 2 has positive refracting power, and the optical axis region 551 of the first side surface 55 of the fifth lens element 5 is convex.

Such a design is conducive to providing an optical lens assembly with a small size, a large aperture, high thermal stability, and can be simultaneously applied to the light sources of different wavebands. The preferred restriction of the above conditional expression is 4.300 EFL*Fno/D11t22≤8.100.

Fourthly, in the optical lens assembly 10 according to the embodiment of the disclosure, it further satisfies an conditional expression of V1+V2+V6≤120.000, which is conducive to correcting the chromatic aberration of the optical lens assembly 10. A preferred restriction is 90.000≤V1+V2+V6≤120.000.

Fifthly, in the optical lens assembly 10 according to the embodiment of the disclosure, the aperture 0 is disposed before the first lens element 1, the optical axis region 262 of the second side surface 26 of the second lens element 2 is concave, the optical axis region 562 of the second side surface 56 of the fifth lens element 5 is concave, satisfies the following conditional expression: T2/T$_{avg}$≥1.500, and further collocates with any one of the following conditions. The first lens element 1 has negative refracting power; the third lens element 3 has positive refracting power; the periphery region 452 of the first side surface 45 of the fourth lens element 4 is concave; the optical axis region 462 of the second side surface 46 of the fourth lens element 4 is concave; the fifth lens element 5 has positive refracting power; the optical axis region 551 of the first side surface 55 of the fifth lens element 5 is convex; the sixth lens element 6 has negative refracting power; the optical axis region 652 of the first side surface 65 of the sixth lens element 6 is concave; the periphery region 654 of the first side surface 65 of the sixth lens element 6 is concave; or the optical axis region 661 of the second side surface 66 of the sixth lens element 6 is convex. With such a design, it is conducive to providing an optical lens assembly with a small size, a large aperture, high thermal stability, and can be simultaneously applied to the light source of different wavebands.

Sixthly, in the optical lens assembly 10 according to the embodiment of the disclosure, the first lens element 1 has negative refracting power, the optical axis region 151 of the first side surface 15 of the first lens element 1 is convex, the second lens element 2 has positive refracting power, the optical axis region 262 of the second side surface 26 of the second lens element 2 is concave, the third lens element 3 has positive refracting power, and the optical axis region 562 of the second side surface 56 of the fifth lens element 5 is concave, and satisfies the following conditional expression: TTL*Fno/D22t62≤3.400, and further collocates with any one of the following conditions. The optical axis region 451 of the first side surface 45 of the fourth lens element 4 is convex; the optical axis region 462 of the second side surface 46 of the fourth lens element 4 is concave; the sixth lens element 6 has negative refracting power; the optical axis region 652 of the first side surface 65 of the sixth lens element 6 is concave; or the optical axis region 661 of the second side surface 66 of the sixth lens element 6 is convex. With such a design, it is conducive to providing an optical lens assembly with a small size, a large aperture, high thermal stability, and can be simultaneously applied to the light sources of different wavebands.

Lastly, in the optical lens assembly 10 according to the embodiment of the disclosure, the absolute value of the focus shift at a temperature of 0° C. to 70° C. is less than or equal to 0.030 mm, therefore it is suitable for usage under different ambient temperatures, so as to prevent the information or the images from being affected by the ambient temperature and become unrecognizable.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. An optical lens assembly, sequentially comprising a first lens element, a second lens element, a third lens element, a fourth lens element, a fifth lens element, and a sixth lens element from a first side to a second side along an optical axis, wherein the first side is a light-exiting side, the second side is a light-incident side, the optical lens assembly is used for projection, after multiple imaging rays sequentially pass through the sixth lens element, the fifth lens element, the fourth lens element, the third lens element, the second lens element and the first lens element and exit from the optical lens assembly, and each of the first lens element to the sixth lens element comprises a first side surface that faces the first side and allows the multiple imaging rays to pass through, and a second side surface that faces the second side and allows the multiple imaging rays to pass through;

when one of the first side surface and the second side surface has a transition point, at which a line tangent to the transition point is perpendicular to the optical axis, a region located radially outside of a farthest Nth transition point from the optical axis to an optical boundary of the one of the first side surface and the second side surface is defined as a periphery region;

when one of the first side surface and the second side surface has no transition point, a region between 50%-100% of a distance between the optical axis and the optical boundary of the one of the first side surface and the second side surface is defined as a periphery region;

an optical axis region of the first side surface of the sixth lens element is concave;

an optical axis region of the first side surface of the fourth lens element is convex;

wherein the optical lens assembly conforms to a following conditional expression:

$T2/T_{avg} \geq 1.500$; and $(T1+G12+T2)/G23 \leq 6.800$, where T1 is a thickness of the first lens element on the optical axis, T2 is a thickness of the second lens element on the optical axis, T$_{avg}$ is an average thickness of all of the lens elements of the optical lens assembly on the optical axis, G12 is an air gap between the first lens element and the second lens element on the optical axis, and G23 is an air gap between the second lens element and the third lens element on the optical axis.

2. The optical lens assembly according to claim 1, wherein an absolute value of a focal shift of the optical lens assembly at a temperature of 0° C.~70° C. is less than or equal to 0.030 mm.

3. The optical lens assembly according to claim 1, wherein the optical lens assembly further conforms to a following conditional expression:

EFL*$Fno$/D11t22≤11.500, where EFL is an effective focal length of the optical lens assembly, Fno is an f-number of the optical lens assembly, and D11t22 is a distance from the first side surface of the first lens element to the second side surface of the second lens element on the optical axis.

4. The optical lens assembly according to claim 1, wherein the optical lens assembly further conforms to a following conditional expression:

TTL/D31t51≤4.000, where TTL is a distance from the first side surface of the first lens element to a reference surface on the optical axis, and D31t51 is a distance from the first side surface of the third lens element to the first side surface of the fifth lens element on the optical axis.

5. The optical lens assembly according to claim 1, wherein the optical lens assembly further conforms to a following conditional expression:

TL*Fno/EFL≤3.000, where TL is a distance from the first side surface of the first lens element to the second side surface of the sixth lens element on the optical axis, Fno is an f-number of the optical lens assembly, and EFL is an effective focal length of the optical lens assembly.

6. The optical lens assembly according to claim 1, wherein
an optical axis region of the second side surface of the second lens element is concave;
the periphery region of the first side surface of the fourth lens element is concave;
the periphery region of the first side surface of the fifth lens element is concave;
the optical lens assembly further conforms to a following conditional expression:

V1+V2+V6≤120.000; and

ALT46/T3≤3.100, where V1 is an Abbe number of the first lens element, V2 is an Abbe number of the second lens element, V6 is an Abbe number of the sixth lens element, and ALT46 is a sum of thicknesses of the fourth lens element, thicknesses of the fifth lens element and thicknesses of the sixth lens element on the optical axis, and T3 is a thickness of the third lens element on the optical axis.

7. The optical lens assembly according to claim 1, wherein the optical lens assembly further conforms to a following conditional expression:

TL/(G23+G34+G45+G56)≤3.700, where TL is a distance from the first side surface of the first lens element to the second side surface of the sixth lens element on the optical axis, G34 is an air gap between the third lens element and the fourth lens element on the optical axis, G45 is an air gap between the fourth lens element and the fifth lens element on the optical axis, and G56 is an air gap between the fifth lens element and the sixth lens element on the optical axis.

8. An optical lens assembly, sequentially comprising a first lens element, a second lens element, a third lens element, a fourth lens element, a fifth lens element, and a sixth lens element from a first side to a second side along an optical axis, wherein the first side is a light-exiting side, the second side is a light-incident side, the optical lens assembly is used for projection, after multiple imaging rays sequentially pass through the sixth lens element, the fifth lens element, the fourth lens element, the third lens element, the second lens element and the first lens element and exit from the optical lens assembly, and each of the first lens element to the sixth lens element comprises a first side surface that faces the first side and allows the multiple imaging rays to pass through, and a second side surface that faces the second side and allows the multiple imaging rays to pass through;
when one of the first side surface and the second side surface has a transition point, at which a line tangent to the transition point is perpendicular to the optical axis, a region located radially outside of a farthest Nth transition point from the optical axis to an optical boundary of the one of the first side surface and the second side surface is defined as a periphery region;
when one of the first side surface and the second side surface has no transition point, a region between 50%-100% of a distance between the optical axis and the optical boundary of the one of the first side surface and the second side surface is defined as a periphery region;
the periphery region of the second side surface of the first lens element is concave;
an optical axis region of the first side surface of the fourth lens element is convex;
the periphery region of the first side surface of the sixth lens element is concave;
wherein the optical lens assembly conforms to a following conditional expression:

$T2/T_{avg} \geq 1.500$; and

T1+G12+T2)/G23≤6.800, where T1 is a thickness of the first lens element on the optical axis, T2 is a thickness of the second lens element on the optical axis, $T_{avg}$ is an average thickness of all of the lens elements of the optical lens assembly on the optical axis, G12 is an air gap between the first lens element and the second lens element on the optical axis, and G23 is an air gap between the second lens element and the third lens element on the optical axis.

9. The optical lens assembly according to claim 8, wherein an absolute value of a focal shift of the optical lens assembly at a temperature of 0° C.~70° C. is less than or equal to 0.030 mm.

10. The optical lens assembly according to claim 8, wherein the optical lens assembly further conforms to a following conditional expression:

ALT/(T1+T2)≤3.000, where ALT is a sum of thicknesses of the first lens element, thicknesses of the second lens element, thicknesses of the third lens element, and thicknesses of the fourth lens element, thicknesses of the fifth lens element and thicknesses of the sixth lens element on the optical axis.

11. The optical lens assembly according to claim 8, wherein the optical lens assembly further conforms to a following conditional expression:

D11t32/(G34+G56)≤3.800, where D11t32 is a distance from the first side surface of the first lens element to the second side surface of the third lens element on the optical axis, G34 is an air gap between the third lens element and the fourth lens element on the optical axis, and G56 is an air gap between the fifth lens element and the sixth lens element on the optical axis.

12. The optical lens assembly according to claim 8, wherein
an optical axis region of the second side surface of the first lens element is concave;

an optical axis region of the second side surface of the second lens element is concave;
the third lens element has positive refracting power;
the periphery region of the first side surface of the fourth lens element is concave;
the periphery region of the second side surface of the fourth lens element is convex;
the periphery region of the first side surface of the fifth lens element is concave.

13. The optical lens assembly according to claim 8, wherein the optical lens assembly further conforms to a following conditional expression:

$D11t32/(G34+G45) \leq 5.100$, where D11t32 is a distance from the first side surface of the first lens element to the second side surface of the third lens element on the optical axis, G34 is an air gap between the third lens element and the fourth lens element on the optical axis, and G45 is an air gap between the fourth lens element and the fifth lens element on the optical axis.

14. The optical lens assembly according to claim 8, wherein the optical lens assembly further conforms to a following conditional expression:

$(ALT+BFL)/D31t51 \leq 3.100$, where ALT is a sum of thicknesses of the first lens element, thicknesses of the second lens element, thicknesses of the third lens element, thicknesses of the fourth lens element, thicknesses of the fifth lens element and thicknesses of the sixth lens element on the optical axis, BFL is a distance from the second side surface of the sixth lens element to a reference surface, and D31t51 is a distance from the first side surface of the third lens element to the first side surface of the fifth lens element on the optical axis.

15. An optical lens assembly, sequentially comprising a first lens element, a second lens element, a third lens element, a fourth lens element, a fifth lens element, and a sixth lens element from a first side to a second side along an optical axis, wherein the first side is a light-exiting side, the second side is a light-incident side, the optical lens assembly is used for projection, after multiple imaging rays sequentially pass through the sixth lens element, the fifth lens element, the fourth lens element, the third lens element, the second lens element and the first lens element and exit from the optical lens assembly, and each of the first lens element to the sixth lens element comprises a first side surface that faces the first side and allows the multiple imaging rays to pass through, and a second side surface that faces the second side and allows the multiple imaging rays to pass through;
when one of the first side surface and the second side surface has a transition point, at which a line tangent to the transition point is perpendicular to the optical axis, a region located radially outside of a farthest Nth transition point from the optical axis to an optical boundary of the one of the first side surface and the second side surface is defined as a periphery region;
when one of the first side surface and the second side surface has no transition point, a region between 50%-100% of a distance between the optical axis and the optical boundary of the one of the first side surface and the second side surface is defined as a periphery region;
the periphery region of the first side surface of the first lens element is convex;
an optical axis region of the first side surface of the fourth lens element is convex;
wherein the optical lens assembly satisfies two following conditional expressions:

$T2/T_{avg} \geq 1.500$;

$TTL*Fno/D22t62 \leq 3.400$; and $(T1+G12+T2)/G23 \leq 6.800$, where T1 is a thickness of the first lens element on the optical axis, T2 is a thickness of the second lens element on the optical axis, $T_{avg}$ is an average thickness of all of the lens elements of the optical lens assembly on the optical axis, TTL is a distance from the first side surface of the first lens element to a reference surface on the optical axis, Fno is an f-number of the optical lens assembly, D22t62 is a distance from the second side surface of the second lens element to the second side surface of the sixth lens element on the optical axis, and the reference surface is a light-emitting surface, G12 is an air gap between the first lens element and the second lens element on the optical axis, and G23 is an air gap between the second lens element and the third lens element on the optical axis.

16. The optical lens assembly according to claim 15, wherein the optical lens assembly further conforms to a following conditional expression:

$(T_{max}+T_{min})/G34 \leq 6.000$, where $T_{max}$ is a thickness of a thickest lens element of the optical lens assembly on the optical axis, $T_{min}$ is a thickness of a thinnest lens element of the optical lens assembly on the optical axis, and G34 is an air gap between the third lens element and the fourth lens element on the optical axis.

17. The optical lens assembly according to claim 15, wherein
the third lens element has positive refracting power;
the periphery region of the second side surface of the fourth lens element is convex;
the optical lens assembly further conforms to a following conditional expression:

$ALT46/T3 \leq 3.100$, where ALT46 is a sum of thicknesses of the fourth lens element, thicknesses of the fifth lens element and thicknesses of the sixth lens element on the optical axis, and T3 is a thickness of the third lens element on the optical axis.

18. The optical lens assembly according to claim 15, wherein the optical lens assembly further conforms to a following conditional expression:

$ALT/(T2+T3) \leq 2.600$, where ALT is a sum of thicknesses of the first lens element, thicknesses of the second lens element, thicknesses of the third lens element, thicknesses of the fourth lens element, thicknesses of the fifth lens element and thicknesses of the sixth lens element on the optical axis, and T3 is a thickness of the third lens element on the optical axis.

19. The optical lens assembly according to claim 15, wherein the optical lens assembly further conforms to a following conditional expression:

$(D11t22+BFL)/T_{max} \leq 2.800$, where D11t22 is the distance from the first side surface of the first lens element to the second side surface of the second lens element on the optical axis, BFL is a distance from the second side surface of the sixth lens element to the reference surface, $T_{max}$ is a thickness of a thickest lens element of the optical lens assembly on the optical axis.

\* \* \* \* \*